(12) United States Patent
Neumann et al.

(10) Patent No.: US 8,668,766 B2
(45) Date of Patent: Mar. 11, 2014

(54) GAS LIQUID CONTACTOR AND METHOD THEREOF

(71) Applicant: Neumann Systems Group, Inc., Colorado Springs, CO (US)

(72) Inventors: David Kurt Neumann, Colorado Springs, CO (US); Keith R. Hobbs, Colorado Springs, CO (US); Jeffrey L. Courtright, Colorado Springs, CO (US)

(73) Assignee: Neumann Systems Group, Inc., Colorado Springs, CO (US)

( * ) Notice: Subject to any disclaimer, the term of this patent is extended or adjusted under 35 U.S.C. 154(b) by 0 days.

(21) Appl. No.: 13/672,697

(22) Filed: Nov. 8, 2012

(65) Prior Publication Data

US 2013/0062427 A1    Mar. 14, 2013

Related U.S. Application Data

(60) Division of application No. 12/586,806, filed on Sep. 28, 2009, which is a continuation-in-part of application No. 12/459,685, filed on Jul. 6, 2009, now Pat. No. 7,866,638, and a continuation-in-part of application No. 12/012,586, filed on Feb. 4, 2008, now Pat. No. 7,871,063, which is a continuation of application No. 11/057,539, filed on Feb. 14, 2005, now Pat. No. 7,379,487.

(60) Provisional application No. 61/100,564, filed on Sep. 26, 2008, provisional application No. 61/100,591, filed on Sep. 26, 2008, provisional application No. 61/100,606, filed on Sep. 26, 2008.

(51) Int. Cl.
 *B01D 47/06* (2006.01)

(52) U.S. Cl.
 USPC ............. 95/224; 95/232; 95/233; 95/235; 95/236

(58) Field of Classification Search
 USPC ............. 95/224, 230, 231–234, 236, 235; 96/236, 239, 271, 322, 356, 358; 239/568, 592, 594, 595, 597–599; 261/115–118, DIG. 9
 See application file for complete search history.

(56) References Cited

U.S. PATENT DOCUMENTS

| 441,106 A | 11/1890 | Monsanto |
| 1,538,457 A | 5/1925 | Zoelly |

(Continued)

FOREIGN PATENT DOCUMENTS

| CN | 1642628 | 7/2005 |
| GB | 2059286 | 4/1981 |

(Continued)

OTHER PUBLICATIONS

U.S. Appl. No. 13/658,818, filed Oct. 24, 2012, Neumann et al.

(Continued)

*Primary Examiner* — Richard L Chiesa
(74) *Attorney, Agent, or Firm* — Aspire IP; Scott J. Hawranek

(57) ABSTRACT

The invention relates to a gas liquid contactor and effluent cleaning system and method and more particularly to individually fed nozzle banks including an array of nozzles configured to produce uniformly spaced flat liquid jets shaped to minimize disruption from a gas. An embodiment of the invention is directed towards a gas liquid contactor having a plurality of modules including a liquid inlet and outlet and a gas inlet and outlet. An array of nozzles is in communication with the liquid inlet and the gas inlet. The array of nozzles is configured to produce uniformly spaced flat liquid jets shaped to minimize disruption from a gas flow and maximize gas flow and liquid flow interactions while rapidly replenishing the liquid.

47 Claims, 17 Drawing Sheets

(56) References Cited

U.S. PATENT DOCUMENTS

| | | | |
|---|---|---|---|
| 2,484,277 A | 10/1949 | Fisher | |
| 2,604,185 A | 7/1952 | Johnstone et al. | |
| 2,631,019 A | 3/1953 | Yates | |
| 2,687,614 A | 8/1954 | Goddard | |
| 2,873,816 A * | 2/1959 | Umbricht et al. | 96/265 |
| 3,215,415 A | 11/1965 | Stephens et al. | |
| 3,237,381 A | 3/1966 | Hvostoff et al. | |
| 3,465,504 A | 9/1969 | Oropeza et al. | |
| 3,488,924 A | 1/1970 | Reeve | |
| 3,524,630 A | 8/1970 | Marion | |
| 3,533,560 A | 10/1970 | Meek | |
| 3,582,050 A | 6/1971 | Kozak | |
| 3,607,624 A | 9/1971 | Moody et al. | |
| 3,621,902 A * | 11/1971 | Okada et al. | 159/4.01 |
| 3,731,461 A | 5/1973 | Hamon | |
| 3,766,489 A | 10/1973 | Rosenberg et al. | |
| 3,771,434 A * | 11/1973 | Davies | 99/454 |
| 3,840,304 A | 10/1974 | Hirafuji | |
| 3,847,714 A | 11/1974 | Davies et al. | |
| 3,914,348 A | 10/1975 | Kors et al. | |
| 3,934,012 A | 1/1976 | Schievelbein | |
| 3,948,608 A | 4/1976 | Weir, Jr. | |
| 3,984,786 A | 10/1976 | Pike | |
| 3,985,860 A | 10/1976 | Mandelik | |
| 4,011,287 A | 3/1977 | Marley | |
| 4,026,682 A | 5/1977 | Pausch | |
| 4,073,832 A | 2/1978 | McGann | |
| 4,083,932 A | 4/1978 | Muraco et al. | |
| 4,099,140 A | 7/1978 | Snelling et al. | |
| 4,102,982 A | 7/1978 | Weir, Jr. | |
| 4,128,206 A | 12/1978 | Bintner | |
| 4,246,245 A | 1/1981 | Abrams et al. | |
| 4,261,511 A | 4/1981 | Erb et al. | |
| 4,269,812 A | 5/1981 | Edwards et al. | |
| 4,284,590 A | 8/1981 | DeBoer et al. | |
| 4,310,476 A | 1/1982 | Nahra et al. | |
| 4,314,670 A | 2/1982 | Walsh | |
| 4,326,553 A | 4/1982 | Hall | |
| 4,340,572 A | 7/1982 | Ben-Shmuel et al. | |
| 4,343,771 A | 8/1982 | Edwards et al. | |
| 4,348,432 A | 9/1982 | Huang | |
| 4,363,786 A | 12/1982 | Adams et al. | |
| 4,378,236 A | 3/1983 | Helms | |
| 4,403,324 A | 9/1983 | Woste | |
| 4,419,301 A | 12/1983 | Nahra et al. | |
| 4,507,969 A | 4/1985 | Djordjevic et al. | |
| 4,633,623 A | 1/1987 | Spitz | |
| 4,641,785 A | 2/1987 | Grothe | |
| 4,668,498 A | 5/1987 | Davis | |
| 4,720,290 A | 1/1988 | McCoy | |
| 4,740,308 A | 4/1988 | Fremont et al. | |
| 4,744,518 A | 5/1988 | Toth | |
| 4,810,268 A | 3/1989 | Chambers et al. | |
| 4,819,878 A | 4/1989 | Bailey et al. | |
| 4,828,768 A | 5/1989 | Talmor | |
| 4,834,288 A | 5/1989 | Kenny et al. | |
| 4,887,100 A | 12/1989 | Michaelis et al. | |
| 4,893,754 A | 1/1990 | Ruiz | |
| 4,913,225 A | 4/1990 | Chubb | |
| 4,915,914 A | 4/1990 | Morrison | |
| 4,948,402 A | 8/1990 | Davis | |
| 4,968,328 A | 11/1990 | Duke | |
| 4,989,788 A | 2/1991 | Bendig et al. | |
| 5,057,853 A | 10/1991 | Fisher | |
| 5,170,727 A | 12/1992 | Nielsen | |
| 5,202,103 A | 4/1993 | Chang et al. | |
| 5,269,967 A | 12/1993 | Achgill | |
| 5,330,563 A | 7/1994 | Yamase et al. | |
| 5,364,604 A | 11/1994 | Spink et al. | |
| 5,392,988 A | 2/1995 | Thayer | |
| 5,395,482 A | 3/1995 | Onda et al. | |
| 5,419,487 A | 5/1995 | Nielsen et al. | |
| 5,464,154 A | 11/1995 | Nielsen | |
| 5,474,597 A | 12/1995 | Halldin | |
| 5,544,571 A | 8/1996 | Nahra et al. | |
| 5,565,180 A | 10/1996 | Spink | |
| 5,580,531 A | 12/1996 | Vassiliou et al. | |
| 5,615,836 A | 4/1997 | Graef | |
| 5,634,413 A | 6/1997 | Listner et al. | |
| 5,639,025 A | 6/1997 | Bush | |
| 5,643,799 A | 7/1997 | Atwater et al. | |
| 5,655,255 A | 8/1997 | Kelly | |
| 5,735,465 A | 4/1998 | Laforcade | |
| 5,744,110 A | 4/1998 | Mimura et al. | |
| 5,802,095 A | 9/1998 | Schall | |
| 5,833,148 A | 11/1998 | Steinhilber et al. | |
| 5,837,206 A | 11/1998 | Traffenstedt et al. | |
| 5,870,422 A | 2/1999 | Florentino et al. | |
| 5,893,943 A | 4/1999 | Durham et al. | |
| 5,947,390 A | 9/1999 | Smith | |
| 5,974,072 A | 10/1999 | Hartlove | |
| 6,010,640 A | 1/2000 | Beshore et al. | |
| 6,051,055 A | 4/2000 | Ukawa et al. | |
| 6,072,820 A | 6/2000 | Dickerson | |
| 6,090,186 A | 7/2000 | Spencer | |
| 6,228,145 B1 | 5/2001 | Falk-Pedersen et al. | |
| 6,309,711 B1 | 10/2001 | Tseng et al. | |
| 6,459,717 B1 | 10/2002 | Henshaw | |
| 6,550,751 B1 | 4/2003 | Brown et al. | |
| 6,612,509 B2 | 9/2003 | Holmstom | |
| 6,652,624 B2 | 11/2003 | Ku et al. | |
| 6,656,253 B2 | 12/2003 | Willey et al. | |
| 6,714,570 B1 | 3/2004 | Brown | |
| 6,760,406 B2 | 7/2004 | Hertz et al. | |
| 6,824,071 B1 | 11/2004 | McMichael | |
| 6,830,608 B1 | 12/2004 | Peters | |
| 6,843,835 B2 | 1/2005 | Fornai et al. | |
| 6,918,949 B1 | 7/2005 | Peters | |
| 6,938,434 B1 | 9/2005 | Fair | |
| 7,021,571 B1 | 4/2006 | Lawson et al. | |
| 7,066,398 B2 | 6/2006 | Borland et al. | |
| 7,116,696 B2 | 10/2006 | Emanuel | |
| 7,163,163 B2 | 1/2007 | Waddelow | |
| 7,219,849 B1 | 5/2007 | Hedger | |
| 7,285,309 B2 | 10/2007 | Nakamura et al. | |
| 7,318,855 B2 | 1/2008 | Newman et al. | |
| 7,379,487 B2 | 5/2008 | McDermott et al. | |
| 7,618,606 B2 | 11/2009 | Fan et al. | |
| 7,866,638 B2 | 1/2011 | Neumann et al. | |
| 7,871,063 B2 | 1/2011 | McDermott et al. | |
| 8,088,292 B2 | 1/2012 | Neumann et al. | |
| 8,105,419 B2 | 1/2012 | Neumann et al. | |
| 8,113,491 B2 | 2/2012 | Neumann et al. | |
| 8,216,346 B2 | 7/2012 | Neumann et al. | |
| 8,216,347 B2 | 7/2012 | Neumann et al. | |
| 8,262,777 B2 | 9/2012 | Neumann et al. | |
| 8,323,381 B2 | 12/2012 | McDermott et al. | |
| 8,336,863 B2 | 12/2012 | Neumann et al. | |
| 8,398,059 B2 * | 3/2013 | Neumann et al. | 261/115 |
| 2002/0061271 A1 | 5/2002 | Zauderer | |
| 2003/0080447 A1 | 5/2003 | Ye et al. | |
| 2004/0126293 A1 | 7/2004 | Geerlings et al. | |
| 2004/0131531 A1 | 7/2004 | Geerlings et al. | |
| 2004/0183216 A1 | 9/2004 | Cross | |
| 2005/0002847 A1 | 1/2005 | Maroto-Valer et al. | |
| 2005/0109861 A1 | 5/2005 | Chen | |
| 2005/0156064 A1 | 7/2005 | Tanigaki et al. | |
| 2005/0229553 A1 | 10/2005 | TeGrotenhuis et al. | |
| 2006/0016728 A1 | 1/2006 | Shorts | |
| 2007/0085227 A1 | 4/2007 | Tonkovich et al. | |
| 2007/0189949 A1 | 8/2007 | Hsieh et al. | |
| 2008/0119356 A1 | 5/2008 | Ryu et al. | |
| 2008/0210199 A1 | 9/2008 | Zeng et al. | |
| 2010/0089232 A1 | 4/2010 | Neumann et al. | |
| 2010/0092368 A1 | 4/2010 | Neumann et al. | |
| 2013/0175715 A1 * | 7/2013 | McDermott et al. | 261/76 |

FOREIGN PATENT DOCUMENTS

| | | |
|---|---|---|
| JP | 59-88510 | 5/1984 |
| JP | 11-114354 | 4/1999 |
| JP | 11-116223 | 4/1999 |

(56) References Cited

FOREIGN PATENT DOCUMENTS

| JP | 11-197499 | 7/1999 |
|----|-----------|--------|
| JP | 2002-136828 | 5/2002 |
| JP | 2006-255629 | 9/2006 |

OTHER PUBLICATIONS

"Carbon Dioxide Storage by Mineral Carbonation," IEA, Report No. 2005/11, Sep. 2005, 41 pages.

"Chilled Ammonia-based Wet Scrubbing for Post-Combustion CO2 Capture," DOE/NETL-401-021507, Feb. 2007, 78 pages.

Ciferno et al., "An Economic Scoping Study for CO2 Capture Using Aqueous Ammonia," DOE/NETL Final Report, 2005, pp. 1-15.

Cullinane, "Thermodynamics and Kinetics of Aqueous Piperazine with Potassium Carbonate for Carbon Dioxide Absorption", pp. 167-171, Dissertation, The University of Texas at Austin, 2005.

Cullinane "Thermodynamics and Kinetics of Aqueous Piperazine with Potassium Carbonate for Carbon Dioxide Absorption," Dissertation, The University of Texas at Austin, May 2005, pp. 209-211.

Definition of "sheet" as found in the Free Dictionary online. Www.thefreedictionary/sheet (Dec. 16, 2011).

Definition of "planar" as found in the Free Dictionary online. Www.thefreedictionary/planar (Dec. 16, 2011).

Drbal et al. (eds.), Power Plant Engineering by Black & Veatch, Chapman & Hall, 1996, pp. 1-879.

Howells, "Super-Water [R] Jetting Applications From 1974 to 1999", pp. 1-21, 1999.

Huijgen, et al., "Cost Evaluation of C02 sequestration by aqueous mineral carbonation," Energy Conversion and Management, 48, pp. 1923-1935, 2007.

Kodama et al., "Development of a new pH-swing CO2 mineralization process with a recyclable reaction solution," Energy, May 2008, vol. 33, pp. 776-784.

Kohl, et al. Gas Purification, Gulf Professional Publishing, 5 ed., 1997.

Lani et al., "Update on DOE/NETL's Advanced Nox Emissions Control Technology R&D Program," U.S. Department of Energy, National Energy Laboratory, Science Applications International Corporation, Nov. 2006, pp. 1-18.

O'Conner et al., "Aqueous Mineral Carbonation: Mineral Availability, Pretreatment, Reaction Parametrics, and Process Studies," National Energy Technology Laboratory (formerly Albany Research Center), DOE/ARC-TR-04-002, Mar. 2005, 459 pages.

Oyenekan, et al., "Alternative Stripper Configurations for C02 Capture by Aqueous Amines", AIChE Journal, vol. 53, No. 12, pp. 3144-3154, 2007.

Plasynski, et al. Carbon Dioxide Capture by Absorption with Potassium Carbonate, Carbon Sequestration, Project Facts, US DOE, NETL, Apr. 2008, 2 pgs.

Trachtenberg, MC, et al. "Seventh International Conference on Greenhouse Gas Control Technologies (GHGT-7)," Vancouver, BC, 2004, 1751-1754.

Van Holst, J., et al. C02 Capture from Flue Gas Using Amino Acid Salt Solutions, Proceedings of 8th International Conference on Greenhouse Gas Control Technologies, 2006.

Yeh, et al., Semi-batch absorption and regeneration studies for C02 capture by aqueous ammonia, Fuel Processing Technology, vol. 86, Issues 14-15, pp. 1533-1546, Oct. 2005.

International Search Report and Written Opinion of the International Searching Authority for PCT/US2009/049707 mailed Aug. 31, 2009.

International Preliminary Report on Patentability for International (PCT) Patent Application No. PCT/US2009/049707, mailed Nov. 8, 2010.

International Search Report and Written Opinion of the International Searching Authority for PCT/US09/58631 mailed Jul. 28, 2010.

International Search Report and Written Opinion of the International Searching Authority for PCT/US2009/58634 mailed Jan. 13, 2010.

International Preliminary Report on Patentability for International (PCT) Patent Application No. PCT/US2009/58634, mailed Nov. 22, 2010.

International Search Report and Written Opinion of the International Searching Authority for PCT/US2009/58637 mailed Jan. 13, 2010.

International Preliminary Report on Patentability for International (PCT) Patent Application No. PCT/US2009/58637, mailed Feb. 15, 2011.

First Office Action (including translation) for Chinese Patent Application No. 200980145932.2, dated Aug. 14, 2012.

Search Report for European Patent Application No. 09816647.3, dated Feb. 10, 2012 7 pages.

Search Report for European Patent Application No. 09817000.4, dated Feb. 10, 2012 12 pages.

Search Report for European Patent Application No. 09817003.8, dated Feb. 15, 2012 7 pages.

Extended Search Report for European Patent Application No. 09817006.1, dated Mar. 28, 2012 10 pages.

First Office Action (including translation) for Chinese Patent Application No. 200980145235.7, dated Feb. 27, 2013.

First Office Action (including translation) for Chinese Patent Application No. 200980145235.7, dated Jan. 23, 2013.

First Office Action (including translation) for Chinese Patent Application No. 200980145726.1, dated Mar. 5, 2013.

\* cited by examiner

Jet Face

Side

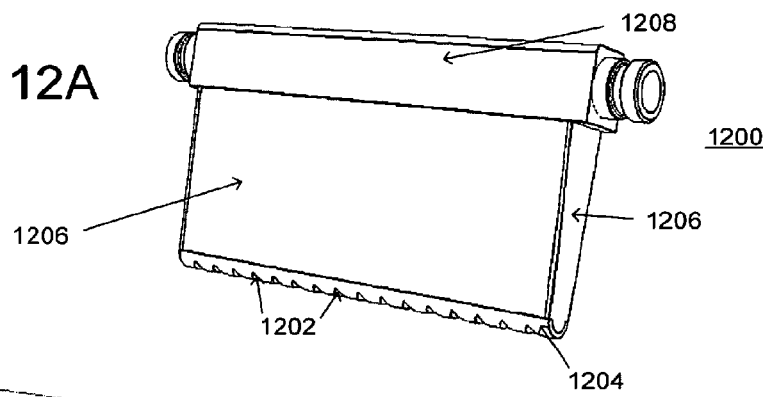
FIG. 12A
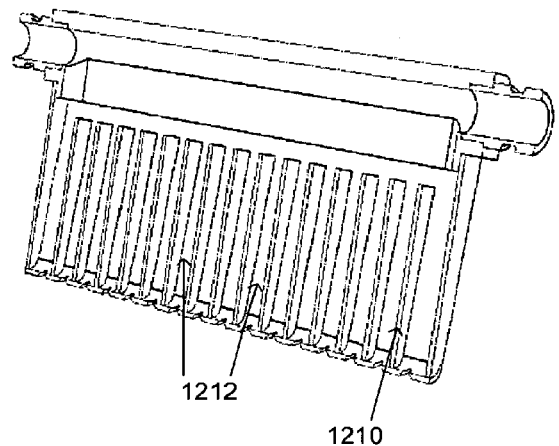
FIG. 12B
FIG. 12C
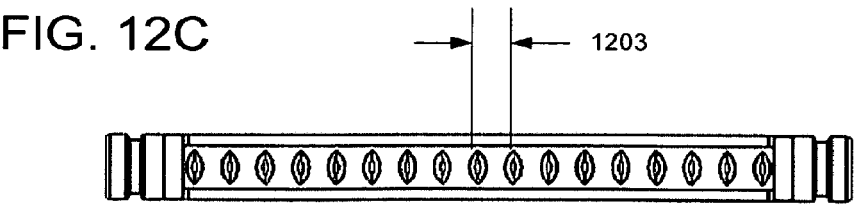

FIG. 13C
FIG. 13D
Gas: 10 Torr, 0 m/s
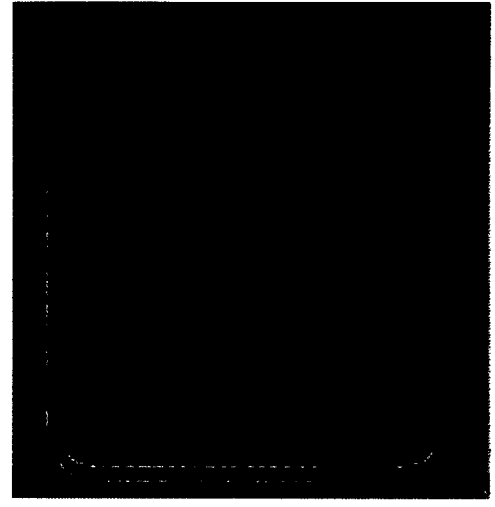
Gas: 100 Torr, 13 m/s

GAS LIQUID CONTACTOR AND METHOD THEREOF

CROSS REFERENCE TO RELATED APPLICATIONS

This application is a divisional of U.S. patent application Ser. No. 12/586,806, entitled "Gas Liquid Contactor and Method Thereof," filed on Sep. 28, 2009, now U.S. Pat. No. 8,398,059, which is a continuation-in-part of U.S. patent application Ser. No. 12/459,685, entitled "Gas Liquid Contactor and Effluent Cleaning System and Method," filed on Jul. 6, 2009, now U.S. Pat. No. 7,866,638, which is a continuation-in-part of U.S. patent application Ser. No. 12/012,568, entitled "Two Phase Reactor," filed on Feb. 4, 2008, now U.S. Pat. No. 7,871,063, which is a continuation of U.S. patent application Ser. No. 11/057,539, entitled "Two Phase Reactor," filed on Feb. 14, 2005, now U.S. Pat. No. 7,379,487; this application also claims the benefits under 35 U.S.C. §119 of U.S. Provisional Application No. 61/100,564, entitled "System for Gaseous Pollutant Removal," filed on Sep. 26, 2008, U.S. Provisional Application No. 61/100,606, entitled "Liquid-Gas Contactor System and Method," filed on Sep. 26, 2008, and U.S. Provisional Application No. 61/100,591, entitled "Liquid-Gas Contactor and Effluent Cleaning System and Method," filed on Sep. 26, 2008; all of which are herein incorporated by reference as if set forth in their entireties.

BACKGROUND OF THE INVENTION

1. Field of the Invention

The invention relates to a gas liquid contactor and effluent cleaning system and method and more particularly to an array of nozzles configured to produce uniformly spaced flat liquid jets shaped to minimize disruption from a gas flow and maximize gas flow and liquid flow interactions while rapidly replenishing the liquid.

2. Discussion of the Related Art

The absorption of a gas into a liquid is a key process step in a variety of gas liquid contacting systems. Gas liquid contactors, also known as gas liquid reactors, can be classified into surface and volume reactors where the interfacial surface area between the two phases is created at the liquid surface and within the bulk liquid, respectively. There are many examples of surface gas liquid reactors such as rotating disks and liquid jet contactors. Rotating disk generators are disks (rotors) partially immersed in a liquid and exposed to a stream of gas. A thin film of liquid solution is formed on the rotor surface and is in contact with a co-current reagent gas stream. The disk is rotated to refresh the liquid reagent contact with the gas. In a volume gas liquid reactor, the gas phase is dispersed as small bubbles into the bulk liquid. The gas bubbles can be spherical or irregular in shape and are introduced into the liquid by gas spargers. The bubbles can be mechanically agitated to increase the mass transfer.

In many gas liquid contacting systems, the rate of gas transport to the liquid phase is controlled by the liquid phase mass transfer coefficient, k, the interfacial surface area, A, and the concentration gradient, delta C, between the bulk fluid and the gas liquid interface. A practical form for the rate of gas absorption into the liquid is then:

$$\Phi = \phi a = k_G a (p - p_i) = k_L a (C_L^* - C_L)$$

where the variable is the rate of gas absorption per unit volume of reactor (mole/(cm³s)); $\phi$ is the average rate of absorption per unit interfacial area (mole/(cm²s)); a is the gas liquid interfacial area per unit volume (cm²/cm³, or cm⁻¹); p and $p_i$ are the partial pressures (bar) of reagent gas in the bulk gas and at the interface, respectively; $C_L^*$ is the liquid side concentration (mole/cm³) that would be in equilibrium with the existing gas phase partial pressure, $p_i$; $C_L$ (mole/cm³) is the average concentration of dissolved gas in the bulk liquid; and kG (mole/(cm²*s*bar)) and $k_L$ (cm/s) are gas side and liquid side mass transfer coefficients, respectively.

In the related art, there are many approaches to maximizing the mass transfer and specific surface area in gas contactor systems. The principal approaches include gas-sparger, wetted wall jet, and spray or atomization. The choice of gas liquid contactor is dependent on reaction conditions including gas/liquid flow, mass transfer, and the nature of the chemical reaction. Table 1 summarizes various mass transfer performance features of some related art gas liquid reactors. To optimize the gas absorption rate, the parameters $k_L$, a, and ($C_L^*-C_L$) must be maximized. In many gas liquid reaction systems the solubility of the $C_L^*$ is very low and control of the concentration gradient, therefore, is limited. Thus, the primary parameters to consider in designing an efficient gas liquid flow reactor are mass transfer and the interfacial surface area to reactor volume ratio, which is also known as the specific surface area.

TABLE 1

COMPARISON OF CONVENTIONAL GAS LIQUID REACTOR PERFORMANCE

| Reactor Type | β (%, gas liquid volumetric flow rate ratio) | $k_G$ (mole/ cm²s atm) × 10⁴ | $k_L$ (cm/s) × 10² | α (cm⁻¹) | $k_L a$ (s⁻¹) × 10² |
|---|---|---|---|---|---|
| Packed Column (counter-current) | 2-25 | 0.03-2 | 0.4-2 | 0.1-3.5 | 0.04-7.0 |
| Bubble Reactors | 60-98 | 0.5-2 | 1-4 | 0.5-6 | 0.5-24 |
| Spray Columns | 2-20 | 0.5-2 | 0.7-1.5 | 0.1-1 | 0.07-1.5 |
| Plate Column (Sieve Plate) | 10-95 | 0.5-6 | 1-20 | 1-2 | 1-40 |

There are various gas liquid contacting reactors whose performance is dependent on interfacial contact area. For example, the chemical oxygen iodine laser (COIL) produces laser energy from a chemical fuel consisting of chlorine gas ($Cl_2$) and basic hydrogen peroxide (BHP). The product of this reaction is singlet delta oxygen, which powers the COIL. The present technology uses circular jets of liquid BHP mixed with $Cl_2$ gas to produce the singlet delta oxygen. In a typical generator, the jets are on the order of 350 microns in diameter or smaller. To generate the jets, the liquid BHP is pushed under pressure through a nozzle plate containing a high density of holes. This produces a high interfacial surface area for contacting the $Cl_2$ gas. The higher the surface area, the smaller the generator will be and the higher the yield of excited oxygen that can be delivered to the laser cavity. Smaller and more densely packed jets improve the specific surface area, but are prone to clogging and breakup. Clogging is a serious problem since the reaction between chlorine and basic hydrogen peroxide produces chlorine salts of the alkali metal hydroxide used to make the basic hydrogen peroxide. Clogging also limits the molarity range of the basic hydrogen peroxide, which reduces singlet oxygen yield and laser power. The heaviest element of the COIL system is this chemical fuel. Problems inherent in producing the fuel increase the weight and decrease the efficiency of the COIL laser as a whole. Thus, there exists a need for a COIL laser that has increased efficiency and lower weight than present designs.

In another example, gas liquid contactors are also used in aerobic fermentation processes. Oxygen is one of the most important reagents in aerobic fermentation. Its solubility in aqueous solutions is low but its demand is high to sustain culture growth. Commercial fermenters (>10,000 L) use agitated bubble dispersion to enhance the volumetric mass transfer coefficient $k_{La}$. The agitation helps move dissolved oxygen through the bulk fluid, breaks up bubble coalescence, and reduces the boundary layer surrounding the bubbles. The interfacial area in these systems is increased by increasing the number of bubbles in the reactor and reducing the size of the bubble diameter. However, oxygen mass transfer to the microorganism is still constrained by the relatively small interfacial surface area of the bubble and the short bubble residence times. Current sparger systems (bubble dispersion) show a relatively small volumetric mass transfer coefficient $k_{La}$ (about 0.2/s); therefore, a new approach for generating maximum interfacial surface area is desired to overcome these mass transfer limitations.

In designing systems for industrial applications, consideration must be given to both cost and efficiency. Conventional wisdom generally precludes that both can be optimally obtained simultaneously. In the case of gas liquid contactors, the conventional wisdom is generally maintained in industrial applications such as chemical processing, industrial biological applications, pollution control, or similar processes requiring reacting or dissolving a gas phase chemistry with a liquid phase in a dynamic flow system.

In the example of pollution control, the standard methodology of removing a target compound or compounds in a wet process is a countercurrent flow system utilizing fine droplets of liquid phase falling through a flowing gas phase 180ÿ in an opposite direction. Normally, gravity is used to draw the liquid phase to a capture sump at the base of a column or tower. The gas phase flows up through the same column or tower. This gas phase is then captured for further processing or released to the atmosphere.

In order to accommodate for larger scale chemical processes, the column or tower must be scaled linearly with the size of the desired process either by length or diameter. The current logical methodology is to increase the scale of a single unit process since capital costs of a single unit process generally do not scale linearly with size.

Another downside of standard countercurrent, gravitational or aerosol/droplet gas liquid contactors is that gas flows must be at a low enough velocity such that gravity effects are greater than the buoyancy of the droplets. Regardless, significant evaporation of the liquid reactant generally does occur since contact times are long, requiring significant capture of that vapor prior to secondary processing or release.

SUMMARY OF THE INVENTION

Accordingly, the invention is directed to a gas liquid contactor and effluent cleaning system and method that substantially obviates one or more of the problems due to limitations and disadvantages of the related art.

An advantage of the invention is to provide large volumetric mass transport coefficients and resultant small size, low pressure sorbent operation requiring minimal pumping capability across the system.

Another advantage of the invention is to provide a gas liquid contactor with a reduced system footprint as compared to the related art.

Yet another advantage of the invention is to provide a gas liquid contactor with a module design.

Still another advantage of the invention is to provide a gas liquid contactor that uses enhanced specific surface area of a flat jet (e.g., thin flat liquid jet) to improve the performance of gas liquid reactors.

Another advantage of the invention is to provide a modular system that, due to its smaller size, footprint, factory build, and high contact area, has a fractional cost and site impact and potentially higher quality and unit to unit consistency as compared to conventional systems for the same reaction or scrubbing capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An embodiment of the invention is directed towards an apparatus. The apparatus includes a chamber, a gas inlet and outlet coupled to the chamber, and a fluid plenum coupled to the chamber. The apparatus also includes an individually fed nozzle bank. The nozzle bank includes a nozzle array coupled to the liquid plenum. The nozzle array is configured to provide essentially planar liquid jets, each of the liquid jets include a planar sheet of liquid. The plurality of liquid jets also lies in substantially parallel planes. The apparatus also includes a gas fluid separator coupled to the reaction chamber.

Still another embodiment of the invention is directed towards an individual feed nozzle bank apparatus. The apparatus includes a plurality of nozzles configured to provide essentially planar liquid jets, the liquid jets comprising a planar sheet of liquid. The nozzles also lie in substantially parallel planes. A feed chamber is coupled to the plurality of nozzles and at least one inlet is coupled to the feed channel.

Yet another embodiment of the invention is directed towards a method of processing gas phase molecules with a gas liquid contactor. This method includes forming a plurality of essentially planar liquid jets with a plurality of individually fed nozzle banks including an array of nozzles. The liquid jets include a planar sheet of liquid and are arranged in substantially parallel planes. Gas with reactive or soluble gas phase molecules is provided to the gas liquid contactor. The process also removes at least a portion of the gas phase molecules by a mass transfer interaction between the gas phase molecules and the liquid jets.

Still another embodiment of the invention is directed towards processing gas phase molecules with a gas liquid contactor. The method includes forming a plurality of essentially planar liquid jets with a plurality of individually fed nozzle banks including an array of nozzles. The liquid jets include a substantially planar sheet of liquid and the liquid includes an aqueous slurry. Gas with reactive or soluble gas phase molecules is provided to the gas liquid contactor. The process also removes at least a portion of the gas phase molecules by a mass transfer interaction between the gas phase molecules and the liquid jets.

Yet another embodiment of the invention is directed towards a method of processing gas phase molecules with a gas liquid contactor. The method includes forming a plurality of instable liquid jets. The instable liquid jets include a distribution of drops formed with a plurality of individually fed nozzle banks. Gas with reactive or soluble gas phase molecules is provided to the gas liquid contactor. The process also removes at least a portion of the gas phase molecules by a mass transfer interaction between the gas phase molecules and the distribution of drops.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings:

FIG. 12A illustrates a perspective view of a nozzle bank according to Example 4;

FIG. 12B illustrates a cross-sectional perspective view of the nozzle bank in FIG. 12A;

FIG. 12C illustrates a bottom view of the nozzle bank in FIG. 12A;

FIG. 13C is a photograph of a front view of jets according to Example 5; and

FIG. 13D is a photograph of a front view of jets according to Example 5.

DETAILED DESCRIPTION OF THE ILLUSTRATED EMBODIMENTS

Figure 1:
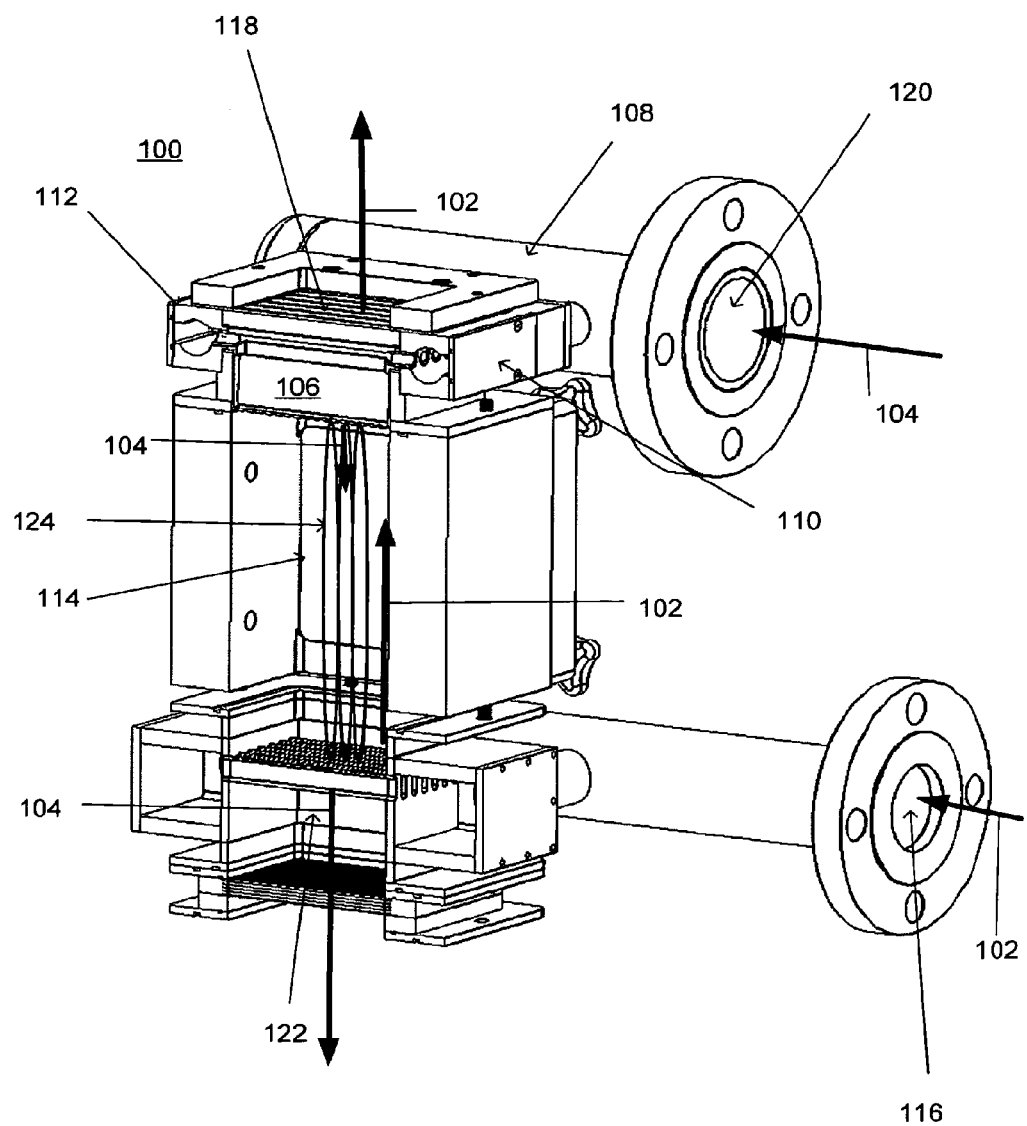
FIG. 1 illustrates a cross-sectional perspective view of a counter flow apparatus according to an embodiment of the invention.

The invention relates to a gas liquid contactor and effluent cleaning system and method and more particularly to an array of nozzles configured to produce uniformly spaced flat liquid jets shaped to minimize disruption from a gas. Moreover, various embodiments directly provide a plurality of small single unit processes, aggregated into modules, which by their design overcome the shortcomings of conventional designs. Modularizing single unit processes allows for small systems which may be scaled by simply multiplying the module by convenient integers to accommodate the scale of the process.

An embodiment of the invention is directed to an apparatus, such as a gas liquid contactor, distillation apparatus, absorber apparatus, scrubber apparatus, ejector apparatus, and the like. The apparatus includes a chamber, a gas inlet coupled to the chamber, and a gas outlet coupled to the chamber. A fluid plenum is coupled to the reaction chamber. The apparatus may include nozzles as described in U.S. patent application Ser. No. 12/459,685, entitled "Gas Liquid Contactor and Effluent Cleaning System and Method," filed on Jul. 6, 2009, which is hereby incorporated by reference as if fully set forth herein. A gas fluid separator is also coupled to the reaction chamber. The gas fluid separator is configured to separate gas and fluid in the apparatus.

In another embodiment, the apparatus includes at least one individually fed nozzle bank. The individually fed nozzle bank includes a nozzle array coupled to the liquid plenum, wherein the nozzle array is configured to provide essentially planar liquid jets. Each of the liquid jets includes a planar sheet of liquid and the plurality of liquid jets lies in substantially parallel planes.

In this embodiment, two or more individually fed nozzle banks may be used and positioned adjacent to each other. The nozzles in these nozzle banks may be formed in a plurality of different configurations, e.g., in a staggered configuration, non-staggered configuration, nozzles having a non-uniform size configuration, e.g., different depth of cut. In one staggered configuration a first row of nozzles of a first nozzle bank, a second row of nozzles in a second nozzle bank and a third row of nozzle in a third nozzle bank, are arranged such that the second row of nozzles is offset and positioned between the first and third row of nozzles.

The individually fed nozzle bank(s) include a nozzle array in fluid communication with the liquid plenum. The nozzle array is configured to provide essentially planar liquid jets, the liquid jets are formed in a substantially planar sheet of liquid and lie in substantially parallel planes. The nozzles may be formed as described in U.S. patent application Ser. No. 12/459,685, entitled "Gas Liquid Contactor and Effluent Cleaning System and Method," filed on Jul. 6, 2009, which is hereby incorporated by reference as if fully set forth herein. The apparatus can be configured such that gas from the gas inlet flows in co-flow direction or counter flow direction.

In this embodiment, the fluid plenum includes a main feed channel coupled to at least one side channel. The side channel is coupled to the individually fed nozzle bank to provide fluid to the nozzle. The fluid may be a liquid, gas, or combination thereof, and the liquid may include solids, e.g., an aqueous slurry.

In a preferred embodiment, the individually fed nozzle bank includes a feed chamber coupled to a nozzle plate. The feed chamber includes a first side wall coupled to the nozzle plate; a second side wall coupled to the nozzle plate and the first side wall; a third side wall coupled to the nozzle plate and the second side wall; and a fourth side wall coupled to the nozzle plate, the third side wall and the first side wall. The first, second, third, and fourth sidewalls and the nozzle plate form a chamber having an opening at an end opposite the nozzle plate. The opening is coupled to a feed tube configured to receive fluid. The coupling may be done by welding, such as tungsten inert gas (TIG) welding, laser welding and the like.

In a preferred embodiment, the feed chamber includes an insert. The insert includes a plurality of feed channels configured to provide individual liquid flow to each nozzle in the nozzle plate. The feed tube has an opening on at least one end and is coupled to at least one side channel of the plenum. The feed tube is coupled with an o-ring seal or by welding. The chamber has a thickness of at least about 1 cm. The chamber has a height above the nozzle bank in a range from about 1 cm to about 8 cm.

In a preferred embodiment, the nozzle plate includes a material having a substantially U-shape, V-shape, or other geometric configuration. The nozzles are elliptically shaped in a more preferred embodiment. In an embodiment, the elliptically shaped nozzles have a minor axis in the range from about 0.5 mm to about 1.5 mm and a major axis in the range from about 0.75 mm to about 5 mm. In a preferred embodiment, the elliptically shaped nozzles have a minor axis in the range from about 0.6 mm to about 1.0 mm and a major axis in a range from about 1.5 mm to about 2.5 mm. The nozzles may be formed to have a depth of cut, such as 0.054 inches, 0.056 inches, 0.058 inches and combinations thereof depth of cut as described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. In a preferred embodiment, the array of nozzles include a plurality of nozzles with uniform spacing between the nozzles. At least one nozzle has a projected cross sectional area in a range from about 0.25 mm$^2$ to about 20 mm$^2$.

The nozzle bank and the flow chamber can be formed from a variety of different materials, e.g., copper, nickel, chrome, steel, aluminum, coated metals, and combinations thereof. In addition, the materials may also include structural polymers, polyimides, composites and combinations thereof.

Another embodiment of the invention is directed towards a method of processing gas phase molecules with a gas liquid contactor. The method includes forming a plurality of essentially planar liquid jets with a plurality of individually fed nozzle banks including an array of nozzles. The liquid jets include a substantially planar sheet of liquid and are arranged in substantially parallel planes. A reactive or soluble gas phase molecule is provided and at least a portion of the gas phase molecule is removed by a mass transfer interaction between the gas phase molecule and the liquid jets. In another embodiment, the liquid may include an aqueous slurry. The aqueous slurry may include a solid concentration in a range from about 0.2% (w/w) to about 30% (w/w). In a preferred embodiment, the aqueous solution includes a solid concentration in a range from about 10% (w/w) to about 25% (w/w).

The gas phase molecule may include a plurality of different gas phase molecules as described in U.S. patent application Ser. No. 12/459,685, entitled "Gas Liquid Contactor and Effluent Cleaning System and Method," filed on Jul. 6, 2009, which is hereby incorporated by reference as if fully set forth herein. For example, the gas phase molecules may include at least one of sulfur oxides, nitrogen oxides, carbon dioxide, ammonia, acid gases, amines, halogens, and oxygen. In a preferred embodiment, the gas phase molecules include carbon dioxide from a combustion process, such as a coal fired plant.

The liquid jet may include a sorbent fluid for sequestering contaminants and/or other fluids as described in U.S. patent application Ser. No. 12/459,685, entitled "Gas Liquid Contactor and Effluent Cleaning System and Method," filed on Jul. 6, 2009, which is hereby incorporated by reference as if fully set forth herein. For example, the liquid jet may include water, ammonia, ammonium salts, amines, alkanolamines, alkali salts, alkaline earth salts, peroxides, hypochlorites and combinations thereof. In a preferred embodiment, the liquid jet includes a calcium salt solution and a magnesium salt solution. The liquid jet may include a seawater solution or brine solution.

In an embodiment, the mass transfer interaction includes a volumetric mass transfer coefficient in a range from about 1 sec$^{-1}$ to about 1500 sec$^{-1}$. In a preferred embodiment, the mass transfer interaction comprises a volumetric mass transfer coefficient in a range from about 5 sec$^{-1}$ to about 150 sec$^{-1}$. In a more preferred embodiment, the mass transfer interaction comprises a volumetric mass transfer coefficient in a range from about 10 sec$^{-1}$ to about 100 sec$^{-1}$. The mass transfer interaction is described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein.

In an embodiment of the invention, the gas may be provided at a variety of different flow rates, for example, at a volume ratio in a range from about 100 min$^{-1}$ to about 1000 min$^{-1}$. Also, the flow rate of fluid into the apparatus may vary, e.g., from 2 psi to about 15 psi in a preferred embodiment. The flat liquid jets in the array have a velocity less than 15 m/sec and more preferably a velocity in a range from about 5 m/sec to about 15 m/sec.

In an embodiment of the invention, the flat liquid jets in the array may have width greater than about 1 cm, such as a width in a range from about 1 cm to about 15 cm in a preferred embodiment. The flat liquid jets can have a thickness in a range from about 10 μm to about 1000 μm, and more preferably a thickness in a range from about 10 μm to about 250 μm, and even more preferably a thickness in a range from about 10 μm to about 100 μm. The flat liquid jets can have a length in a range from about 5 cm to about 30 cm, and more preferably a length in a range from about 5 cm to about 20 cm. It is noted that not every jet needs to fall within the aforementioned ranges of thickness, width, and length. However, in a preferred embodiment, the jets have a substantially uniform width, length, and thickness.

Yet another embodiment of the invention is directed towards a method of processing gas phase molecules with a gas liquid contactor. The method includes forming a plurality of instable liquid jets including a distribution of drops from individually fed nozzle banks including an array of nozzles. The method includes providing gas with at least one reactive or soluble gas phase molecule and removing at least a portion of the gas phase molecules by a mass transfer interaction between the gas phase molecules and the distribution of drops.

In this embodiment, combining operating conditions, e.g., high plenum pressures with a tightly packed array of nozzles, leads to collisions between jets that generate a distribution of drops. In a preferred embodiment, the distribution of drops is a dense and substantially uniform distribution. The droplet distribution includes a range of droplet sizes from about 50 microns to about 2 mm, and a range of liquid partial volumes between 0.5% and 20%. As the plenum pressure increases, the velocity of the liquid feeding the nozzles increases; this results in competition for water, which leads to instabilities in the flat jets. The instabilities manifest themselves in the jets in at least two ways. First, there is a pulsing of the jets, both along the same axis of the water flow and in the transverse axis (nozzle to nozzle competition). Jet pulsing results from high plenum flow rates and leads to competition between adjacent nozzles such that the width of a jet may oscillate. The competition can result in a varying of the flow rate for an individual nozzle leading to jet pulsing. Second, the development of the linear sheet instability that is present in these types of jets under optimal conditions is also accelerated.

In another embodiment of the invention, the spacing of the jets is such that pulsing, combined with the linear sheet instabilities from each jet, results in collisions between neighboring jets, thereby forming a distribution of drops. These collisions lead to the generation of high velocity, e.g., velocities in the range from about 5 m/s to about 10 m/s or greater. The high droplet velocity results from the initial high velocity of the jets at the exit of the nozzles, e.g., velocities in the range from about 5 m/s to about 10 m/s or greater. The large droplet velocity coupled with the droplet size distribution minimizes the effects of external forces on the droplets, such as forces caused by a gas flow or gravity, leaving the overall droplet momentum unchanged. Moreover, the droplet velocity is small enough to provide reaction enhancement due to increased surface area.

The droplet generator may be obtained by adjusting at least one of depth of cut (DOC) of the nozzle, nozzle to nozzle spacing, nozzle bank to nozzle bank spacing, operating plenum pressure; using enhancers that decrease surface tension and/or viscosity; and combinations thereof in order amplify the natural jet instabilities. For example, as the depth of cut of the nozzle is decreased the operating pressure to obtain an instability in the jet is reduced. Also, as the nozzle to nozzle spacing is decreased the operating pressure to obtain jet instability is also reduced. As the operating plenum pressure is increased the velocity of the jet is increased, and collisions lead to instability of the jets. Enhancers may also be used to decrease surface tension which tends to widen jets and therefore increase jet-jet collisions and amplify the natural jet instabilities. Finally, enhancers that decrease viscosity tend to increase the susceptibility of the fluid to being deformed jets and therefore tend to amplify the natural jet instabilities.

In a preferred embodiment, a gas liquid contactor includes a nozzle array having nozzles with a 0.052 DOC, nozzle to nozzle spacing of about 2 mm, nozzle bank to nozzle bank spacing of about 2 cm, and no stability unit. The individual nozzles are further described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. The gas liquid contactor is operated at a plenum pressure of 15 psi or greater to produce instable jets that break up. Preferably, the gas liquid contactor operates at a plenum pressure in a range from about 17 psi to about 75 psi and, more preferably, operates in a plenum pressure range of about 17 psi to about 30 psi.

In another preferred embodiment, a gas liquid contactor includes a nozzle array having nozzles with a 0.054 DOC, nozzle to nozzle spacing of about 2 mm, nozzle bank to nozzle bank spacing of about 2 cm, and no stability unit. The nozzles are further described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. The gas liquid contactor is operated at a plenum pressure of 13 psi or greater to produce instable jets that break up. Preferably, the gas liquid contactor operates at a plenum pressure in a range from about 15 psi to about 73 psi and, more preferably, operates in a plenum pressure range of about 15 psi to about 28 psi.

In still another preferred embodiment, a gas liquid contactor includes a nozzle array having nozzles with a 0.056 DOC, nozzle to nozzle spacing of about 2 mm, nozzle bank to nozzle bank spacing of about 2 cm, and no stability unit. The gas liquid contactor is operated at a plenum pressure of 11 psi or greater to produce instable jets that break up. Preferably, the gas liquid contactor operates at a plenum pressure in a range from about 11 psi to about 71 psi and, more preferably, operates in a plenum pressure range of about 13 psi to about 26 psi.

As the DOC of the nozzle increases, i.e., the nozzle dimensions are increased, the amount of plenum pressure required to produce instability in the jets decreases. This is due to the increased velocity of the fluid through the nozzles as the DOC increases or the nozzle size increases.

Reference will now be made in detail to an embodiment of the present invention, an example of which is illustrated in the accompanying drawings.

FIG. 1 illustrates a cross-sectional perspective view of a counter flow apparatus according to an embodiment of the invention.

Referring to FIG. 1, the counter flow apparatus is generally depicted as reference number 100. In operation of the apparatus 100 gas flow is shown by reference number 102 and fluid flow is shown by reference number 104. A plurality of individually fed nozzle banks 106 are positioned adjacent to each other. The individually fed nozzle banks 106 include a nozzle array in fluid communication with a fluid plenum that includes a main feed channel 108 coupled to a first side channel 110 and a second side channel 112. The apparatus includes a chamber 114, a gas inlet 116, a gas outlet 118, a liquid inlet 120, and a liquid outlet 122. The apparatus also includes a liquid gas separator (not shown) as described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. The individually fed nozzle banks are configured to provide essentially planar liquid jets 124, each of the liquid jets including a substantially planar sheet of liquid. The plurality of liquid jets lies in substantially parallel planes.

Figure 2:
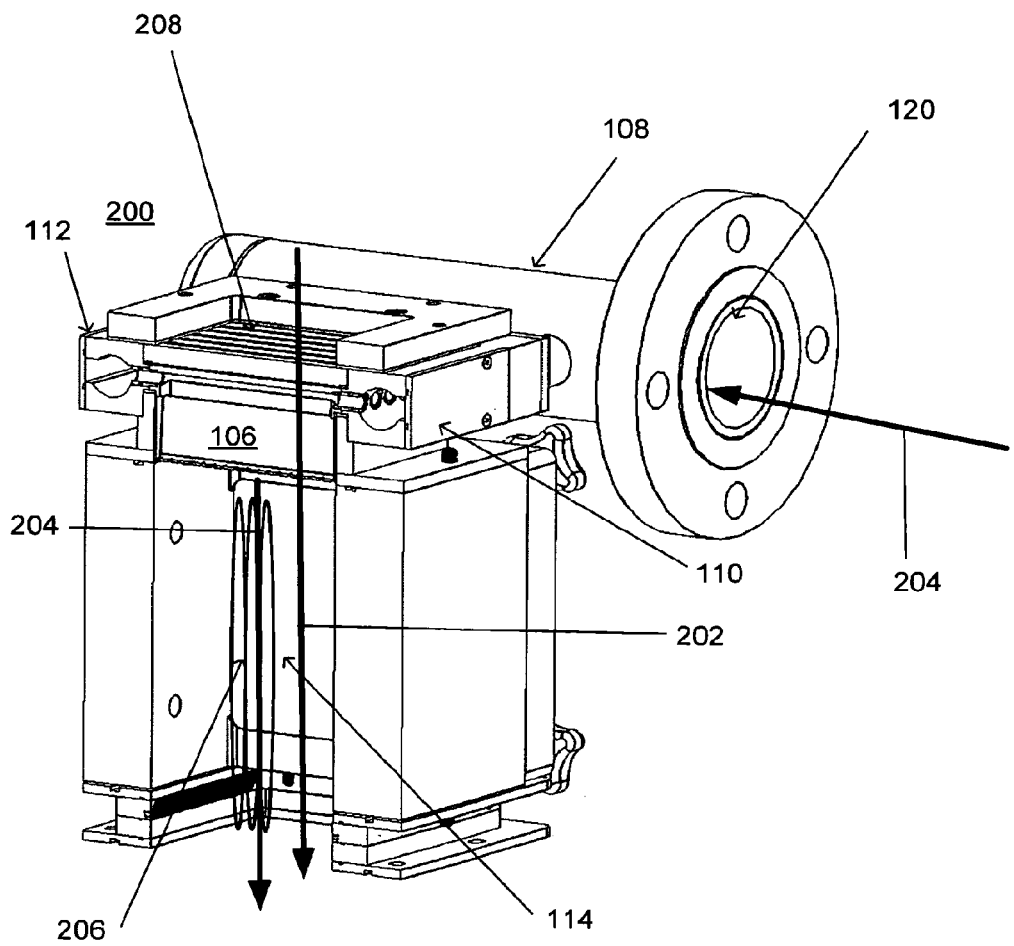
FIG. 2 illustrates a cross-sectional perspective view of a co-flow apparatus according to another embodiment of the invention.

FIG. 2 illustrates a cross-sectional perspective view of a co-flow apparatus according to an embodiment of the invention. Referring to FIG. 2, the co-flow apparatus is generally depicted as reference number 200. In operation of the apparatus 200 gas flow is shown by reference number 202 and fluid flow is shown by reference number 204. A plurality of individually fed nozzle banks 106 is positioned adjacent to each other. The individually fed nozzle banks 106 include a nozzle array in fluid communication with a fluid plenum that includes a main feed channel 108 coupled to a first side channel 110 and a second side channel 112. The apparatus includes a chamber 114, a gas inlet 208, a gas outlet, a liquid inlet 120, and a liquid outlet. The apparatus also includes a liquid gas separator (not shown) as described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. The individually fed nozzle banks are configured to provide essentially planar liquid jets 206, each of the liquid jets including a substantially planar sheet of liquid. The plurality of liquid jets lies in substantially parallel planes.

Figure 3A:
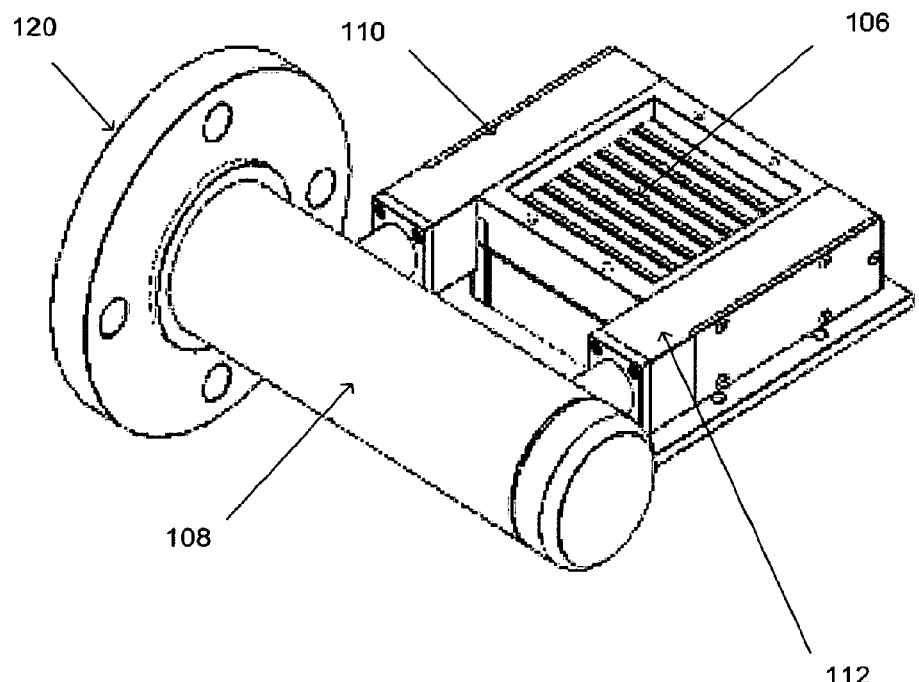
FIG. 3A illustrates a perspective view of the nozzle apparatus of FIGS. 1 and 2.
Figure 3B:
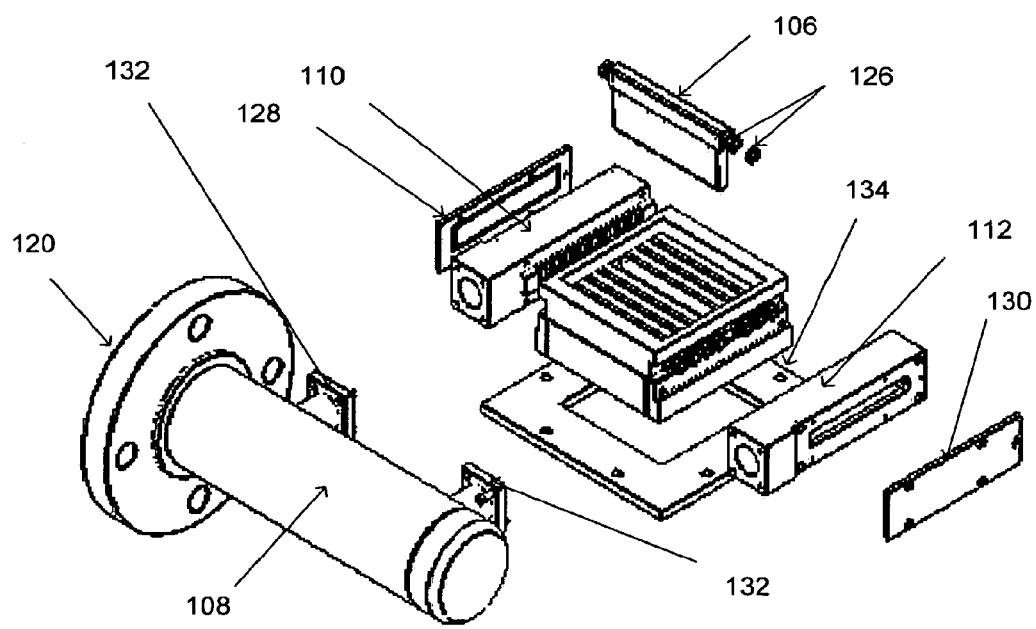
FIG. 3B illustrates an exploded perspective view of the nozzle apparatus of FIG. 3A.
Figure 4A:
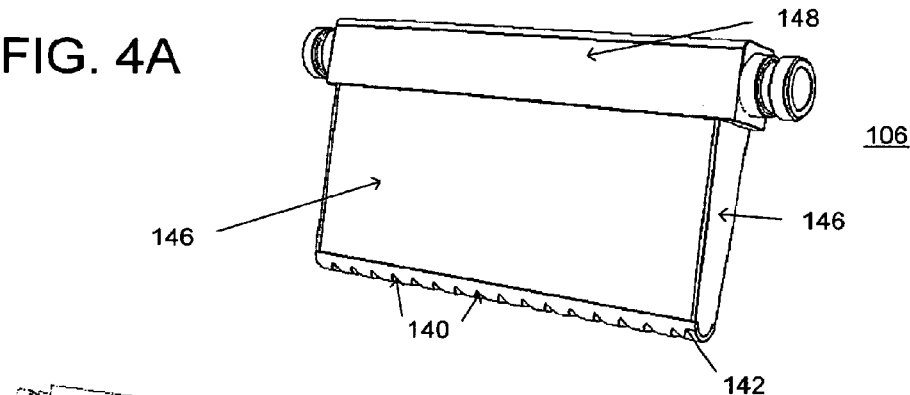
FIG. 4A illustrates a perspective view of the nozzle bank of FIG. 3B.
Figure 4B:
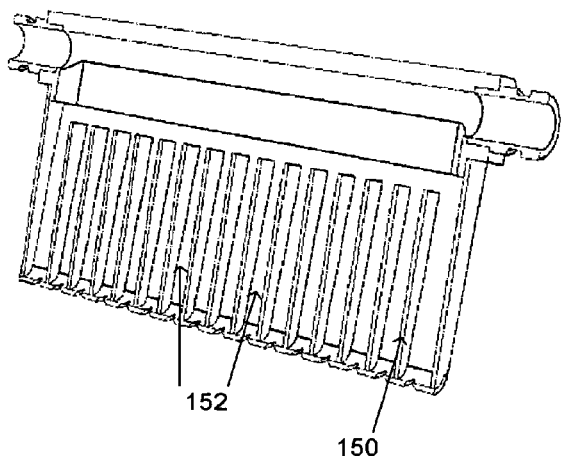
FIG. 4B illustrates a cross-sectional view of the nozzle bank of FIG. 4A along line A to A'.
Figure 5:
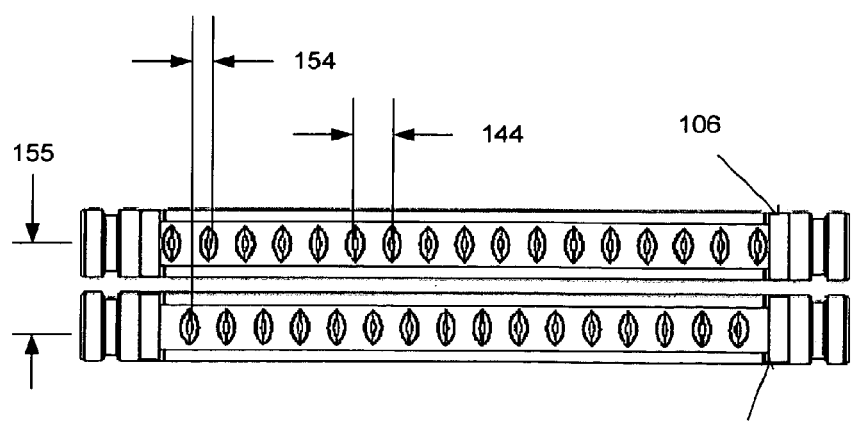
FIG. 5 illustrates a bottom view of the nozzle bank of FIG. 4A and FIG. 6.

FIG. 3A illustrates a perspective view of a nozzle apparatus. FIG. 3B illustrates an exploded perspective view of the nozzle apparatus of FIG. 3A. FIG. 4A illustrates a perspective view of a nozzle bank of FIG. 3B. FIG. 4B illustrates a cross-sectional view of the nozzle bank of FIG. 4A along line A to A'. FIG. 5 is a bottom view of the individually fed nozzle bank of FIG. 4B.

Referring now to FIGS. 3A-5, the apparatus includes a plurality of individually fed nozzle banks 106 positioned adjacent to each other. The individually fed nozzle banks 106 include a nozzle array in fluid communication with a fluid plenum that includes a main feed channel coupled 108 to a first side channel 110 and a second side channel 112. The individually fed nozzle banks 106 are coupled to the first side channel 110 and the second side channel 112 with a sealing mechanism 126, such as an o-ring seal or other seal as known in the art. In this embodiment, the first side channel 110 has an access plate 128 in order to provide access to the first side channel for servicing the unit. In addition, the second side channel 112 also includes an access plate 130. The access plates (128, 130) are connected by an attachment mechanism, such as a screw, rivet, or the like. Of course, the access plates (128, 130) may also be welded to their respective side channels. The first side channel 110 and the second side channel 112 are coupled to the main feed channel 108 with an attachment mechanism at connection point 132, such as a screw, rivet, welding or the like. A sealing layer may be used in all connection points as known in the art in order to prevent leaks, e.g., a malleable material. An attachment plate 134 may be used to couple the apparatus to the reaction chamber.

Referring now to FIGS. 4A-5, the individually fed nozzle bank 106 was formed with a stainless steel tube 142. The tube was cut in half lengthwise. Nozzles 140 were cut into the tube 142. The spacing 144 of the nozzles 140 may be in a range suitable for a desired application, e.g., a range from about 1 mm or greater, in a preferred embodiment about 1 cm or greater. A plurality of nozzles was formed in the tube. The tube 142 was attached, e.g., welded, to plates 146, which in turn were attached to a feed body 148, thereby forming a chamber. As the length of the chamber increases, the stability of the nozzle and direction flow of the nozzle increase as discussed in the Examples. The dimensions of the chamber may be adjusted accordingly.

Figure 6:
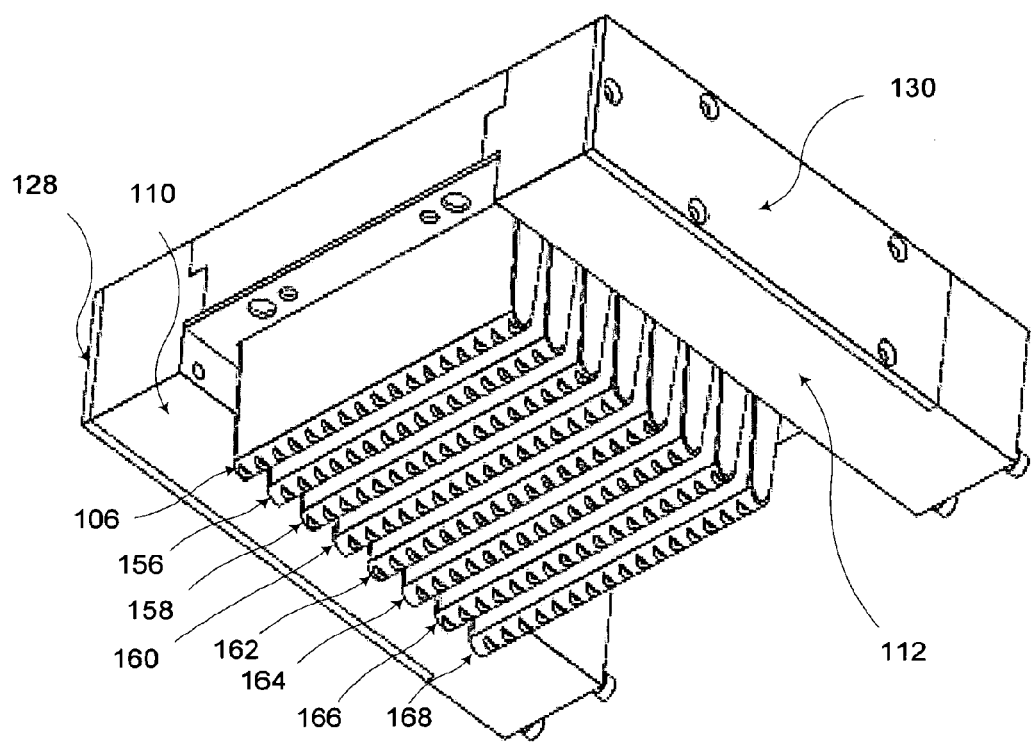
FIG. 6 illustrates a perspective view of an apparatus according to an embodiment of the invention.

In addition, in this embodiment optional dividers may be utilized to provide an improved jet performance. A divider 150 or a plurality of dividers may be used. The divider 150 may be configured to provide separate feed channels 152 as depicted in the cross sectional drawing of the nozzle bank in FIG. 4B. Referring now to FIGS. 5 and 6, it is shown that a plurality of individually fed nozzle banks may be used. In this embodiment, eight nozzle banks (106, 156, 158, 160, 162, 164, 166, 168) were assembled in an array. The array is configured to permit gas to pass between the liquid jets from the individual nozzle array. Of course, the number of individual nozzle banks may be adjusted up or down depending on the scale of the apparatus and the desired gas flow and velocity.

Also, in this embodiment nozzles of adjacent nozzle banks were interlaced. For example, the nozzles of nozzle bank 106 are offset from the nozzles in bank 156, and alternated in the array so that adjacent nozzle banks have interlaced flat jets. The space between adjacent nozzle banks (from centerline to centerline) is shown by reference number 155 and may be in a range from about 1.2 or greater. The space between adjacent nozzles is depicted as reference number 144 and may be in a range from about 1 mm to about 10 mm The space between nozzles of adjacent nozzle banks is depicted as reference number 154 and may be in a range from about 0.5 mm to about 5 mm. Of course, a plurality of different configurations may be employed, such as varying the distance between adjacent nozzle banks in the array and varying the distance between nozzles. In a preferred embodiment, those distances are uniform.

EXAMPLES

Example 1

In Example 1, a single jet test apparatus was utilized to illustrate how water exits a nozzle under normal operating conditions. The apparatus is described with reference to FIGS. 7A-7C.

Figure 7A:
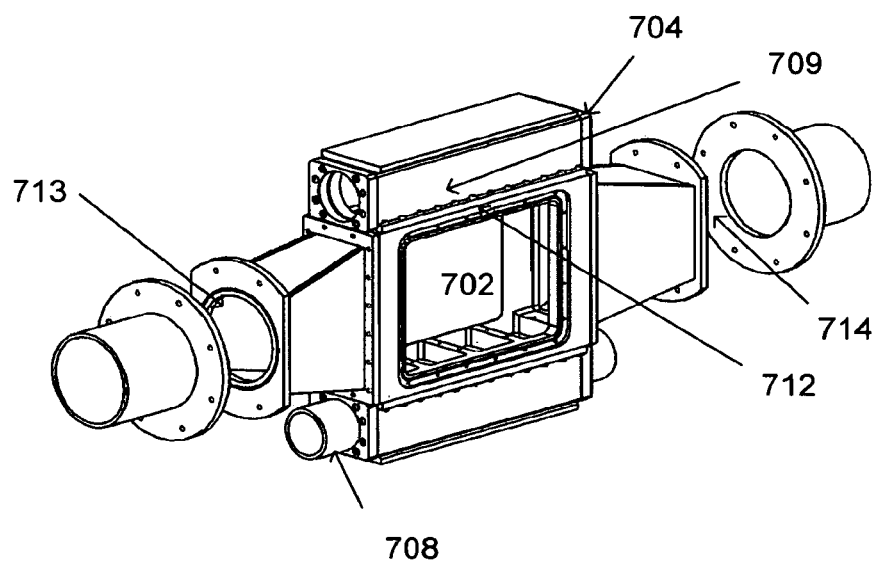
FIG. 7A illustrates an apparatus according to Example 1.
Figure 7B:
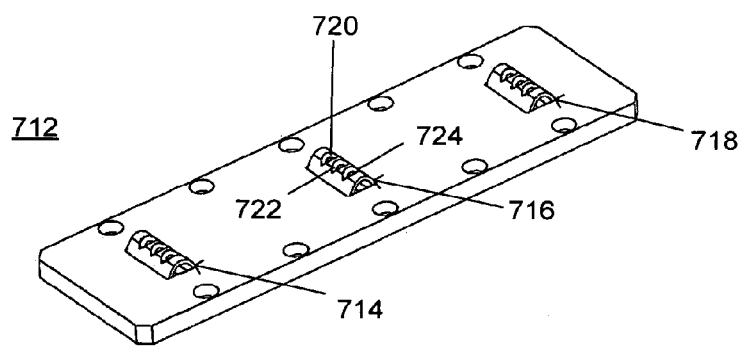
FIG. 7B illustrates an exit side of a nozzle plate according to Example 1.
Figure 7C:
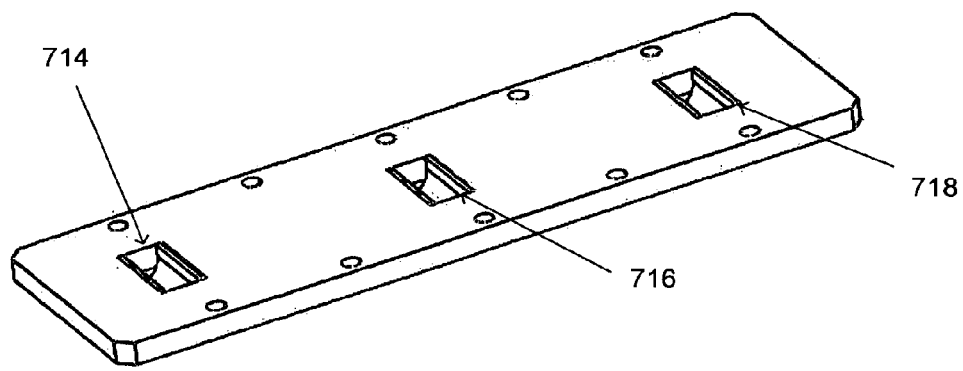
FIG. 7C illustrates an entrance side of a nozzle plate according to Example 1.

Referring to FIGS. 7A-7C, the apparatus is generally depicted as reference number 700 and includes an operating chamber 702, a liquid inlet 704, a fluid exit 708, a gas inlet 713 and a gas exit 714. The fluid exit 708 is connected to a recirculation loop and coupled to a pump (not shown) and the fluid inlet 704. A pressure gauge (not shown) is mounted for measuring fluid pressure in a plenum 709 above a nozzle plate 712. The plenum is a sealed chamber formed above the plate 712 and has dimensions of 226 mm wide by 28.5 mm tall by 20 mm deep. The nozzle plate 712 includes three nozzle banks 714, 716, and 718. In this configuration each nozzle bank includes three nozzles. In particular, nozzle bank 716 includes a first nozzle 720, a second nozzle 722, and a third nozzle 724. Each nozzle is separated by a uniform distance— the distance between the first nozzle 720 and the second nozzle 722 is 4 mm. The distance between the nozzle banks 714, 716, and 718 is uniform. In this Example, the distance between nozzle bank 714 and nozzle bank 716 is about 5 cm.

Each nozzle (720, 722, 724) was formed by cutting a 0.056 inch depth of cut (DOC) into a tube (not shown). The tube was then cut and laser welded onto a plate thereby forming the plate of nozzle banks. The tube was stainless steel material having a thickness of 0.90 mm. The nozzle plate was stainless steel material having a thickness of 4.72 mm. Each nozzle is also formed to have a major and minor axis of 2.67 mm and 1.2 mm, respectively. In this Example, nozzle bank 714 and nozzle bank 718 were plugged by filling them with a bead of wax, i.e., a high melting point paraffin. In addition, in nozzle bank 716, nozzles 720 and 724 were also filled with the same wax material, thereby leaving only one nozzle 722 operational. The plate 712 was then positioned in the apparatus 700 as shown in FIG. 7A. The liquid plenum 709 is arranged above the plate 712 and liquid is configured to flow substantially horizontally across the plate 712. The area ratio between the opening of the nozzle 722 and the liquid plenum is about 1:350.

Figure 7D:
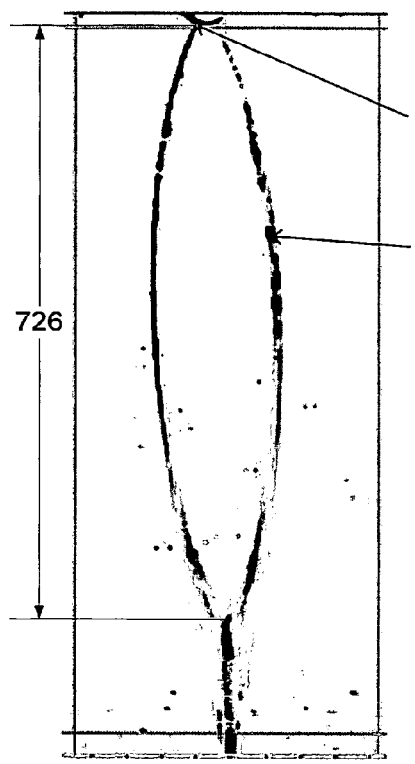
FIG. 7D is a photograph of a front view of a jet according to Example 1.
Figure 7E:
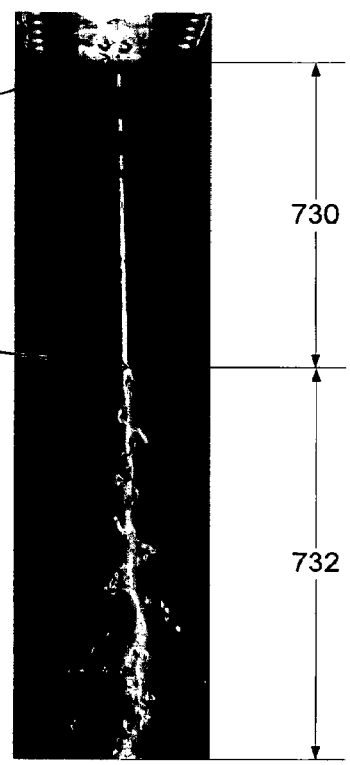
FIG. 7E is a photograph of a side view of a jet according to Example 1.

In operation, the liquid inlet 704 was used to provide tap water at ambient conditions to the plenum 709. The pressure gauge had a reading of about 7 psi indicating pressure in the plenum 709. FIG. 7D is a photograph of a face of a jet formed in Example 1. FIG. 7E is a photograph of a side view of the jet formed in Example 1.

Now referring to FIGS. 7D and 7E, the water exits the nozzle 722 and forms a flat jet 725. The jet 725 is formed to a length of about 12 cm. This length is measured as indicated by reference number 726. The length of the jet is measured from the exit of the nozzle to where the jet recombines at the bottom. As shown in section 728, linear sheet instability begins and the jet begins to break up. The breakup length is the point where the jet begins to break up. The stability of the jet is shown by reference number 730. The instability region is indicated by reference number 732 and becomes important when multiple jets are placed in close proximity as described herein.

Example 2

Figure 8A:
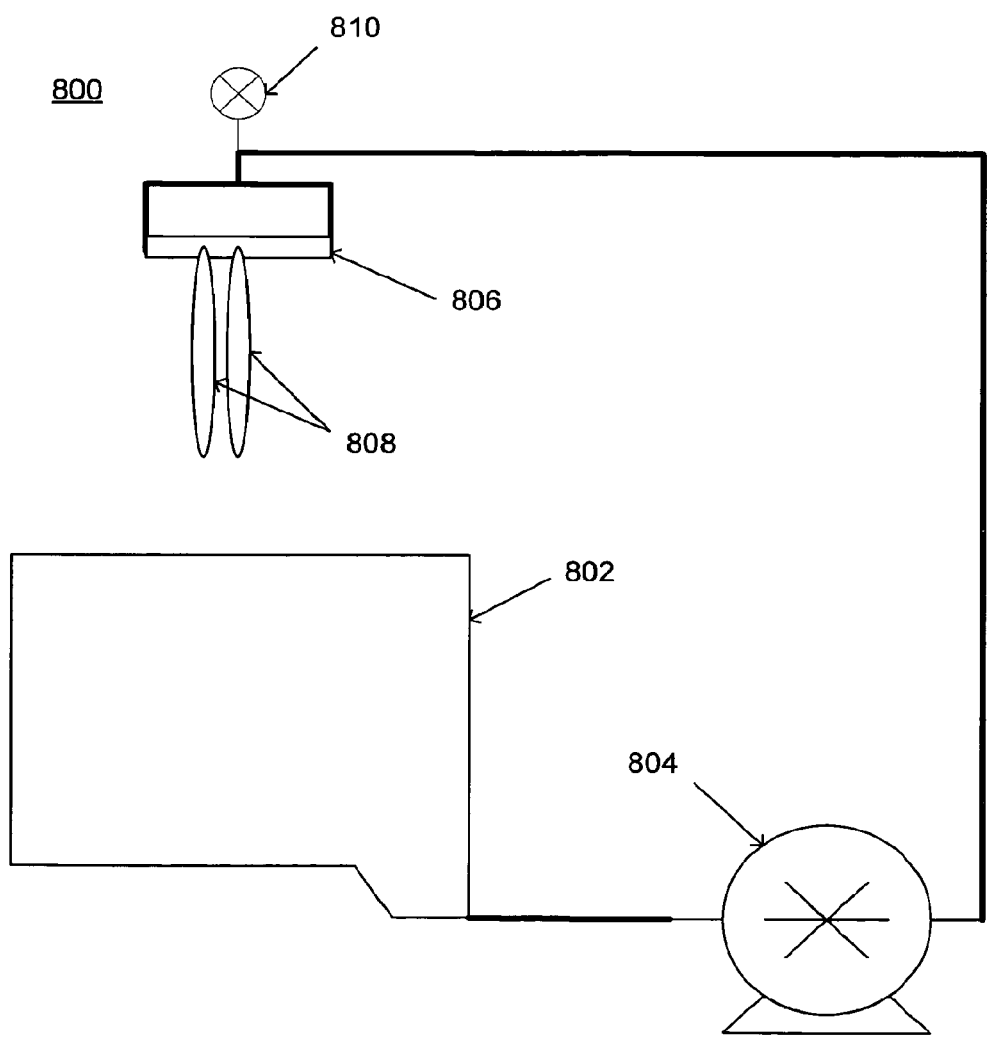
FIG. 8A illustrates a system according to Example 2.

In Example 2, an array of jets was formed with the test stand apparatus of FIG. 8A. The system is generally depicted as reference number 800. The system 800 includes a fluid catch basin 802, a fluid pump 804, and tubing connecting the single nozzle bank 806. Fluid flowed in a recirculation manner from the catch basin 802 to the pump and though the nozzle bank 806 to produce flat jets 808 that were recaptured in the catch basin. The tubing from the pump was tied just upstream of the nozzle bank to allow feeding from both sides of the nozzle bank. A pressure gauge 810 was placed on the fluid line at the tee to measure fluid pressure supplied to the nozzle bank.

Figure 8B:
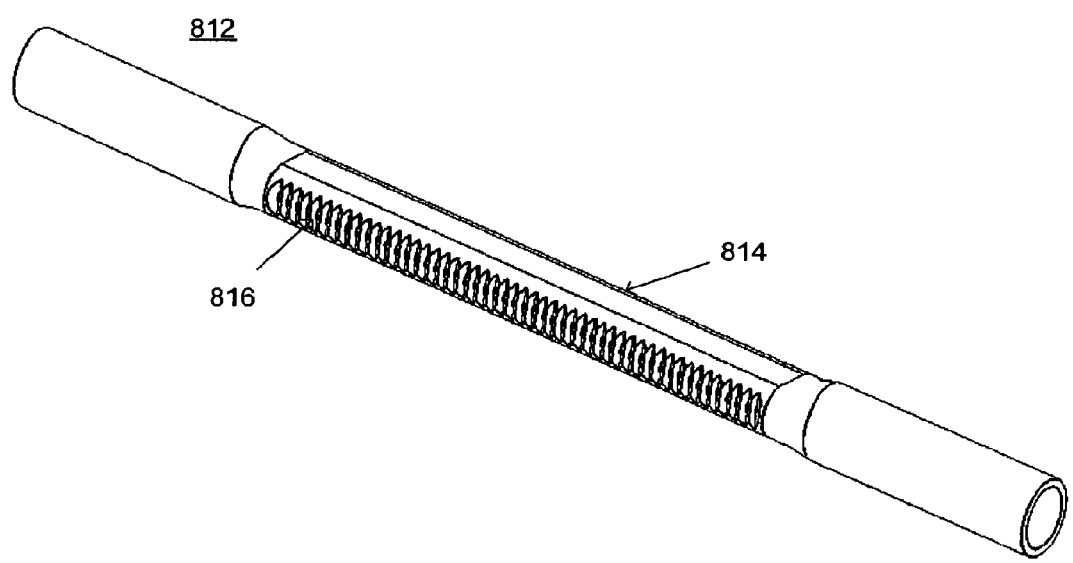
FIG. 8B illustrates a nozzle bank according to Example 2.

FIG. 8B illustrates a nozzle bank used in Example 2. The nozzle bank is generally depicted as reference number 812. The nozzle bank 812 was formed from an 8 inch long, 0.5 inch diameter stainless steel tube. A 4 inch middle portion 814 of the tube was compressed to form a 0.375 inch wide ellipse. The nozzle bank included nozzles 816. In this Example, thirty-two nozzles were cut into the tube via wire electrical discharge machining (EDM). Each nozzle 816 was separated by a uniform distance of about 2 mm. For this Example, every other nozzle was taped off, such that sixteen nozzles were utilized and each nozzle was separated by 4 mm.

Figure 9:
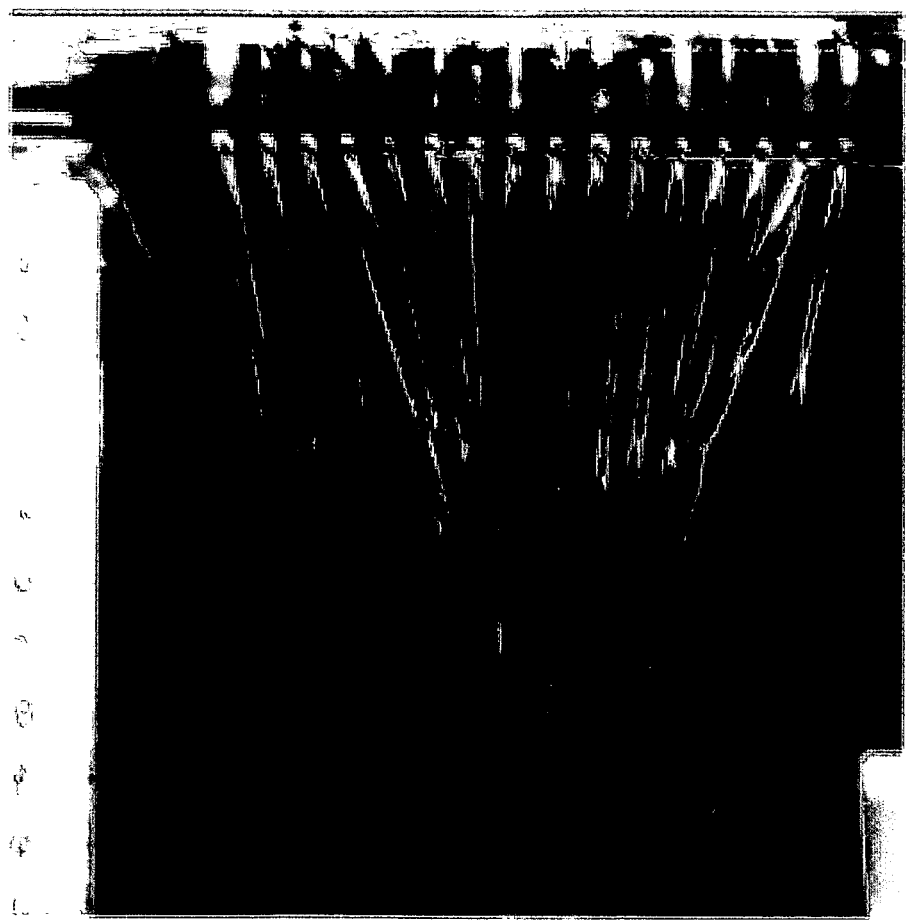
FIG. 9 is a photograph of a front view of jets according to Example 2.

FIG. 9 is a photograph of jets formed in Example 2.

Referring to FIG. 9, in operation of the apparatus in Example 2, 100% (w/w) ethylene glycol was flowed through the nozzle bank at ambient temperature. The pressure gauge 810 had a reading of about 11 psi indicating the nozzle bank pressure. As shown in FIG. 9, the inner jets converged at a distance of about 5 cm from the nozzle bank 812, as indicated by the 1 cm grid scale to the left of the nozzle bank 812. The outer jets converged at about 20 cm from the nozzle bank 812. The convergence of the jets in this Example is problematic with the placement of the nozzle bank in an interlaced array. Also, there was limited surface area of the jets due to the convergence.

Example 3

In Example 3, an array of jets was formed with the test stand apparatus of Example 2. For this Example, the nozzle bank 812 was modified with a channel insert as shown in FIGS. 10A-10B.

Figure 10A:
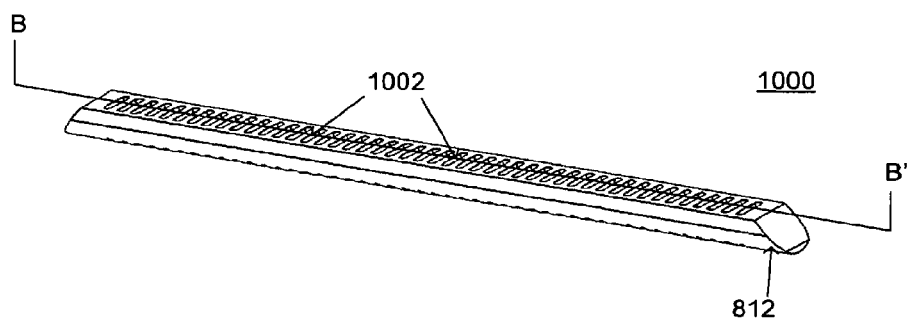
FIG. 10A illustrates a cross-sectional perspective view of the channel insert according to Example 3.

FIG. 10A illustrates a cross-sectional perspective view of a channel insert according to Example 3. FIG. 10B illustrates a cross-sectional perspective view of a channel insert of FIG. 10A taken along line B to B'.

Figure 10B:
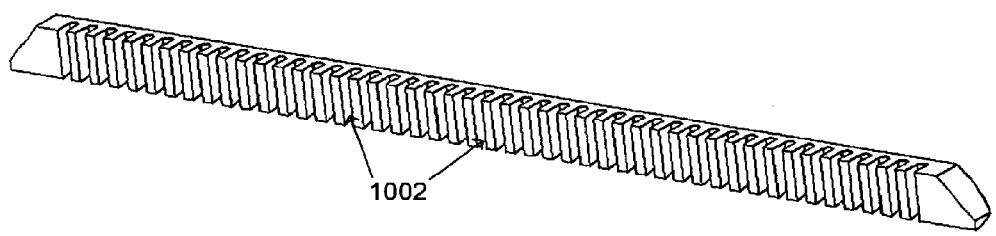
FIG. 10B illustrates a cross-sectional perspective view of a channel insert of FIG. 10A taken along B to B'.

Referring to FIGS. 10A-10B, the channel insert is generally depicted as reference number 1000. The channel insert 1000 was fastened to an inside wall of the nozzle bank 812 by set screws (not shown) through the opposing nozzle bank wall. The channel insert 1000 was formed from an aluminum block. A plurality of channels 1002 were machined into the block to match the corresponding nozzle openings in the nozzle bank 812. The individual channels 1002 in the insert were formed to be about 0.039 inches in width, about 0.175 inches in length, and about 0.19 inches in depth. The edges of the insert were beveled to facilitate fluid flow through the nozzle bank, and one side was rounded to match the inside geometry of the tube. In this Example, 5 nozzles were utilized with remaining nozzles blocked by tape. The spacing between nozzles was 4 mm.

Figure 11:
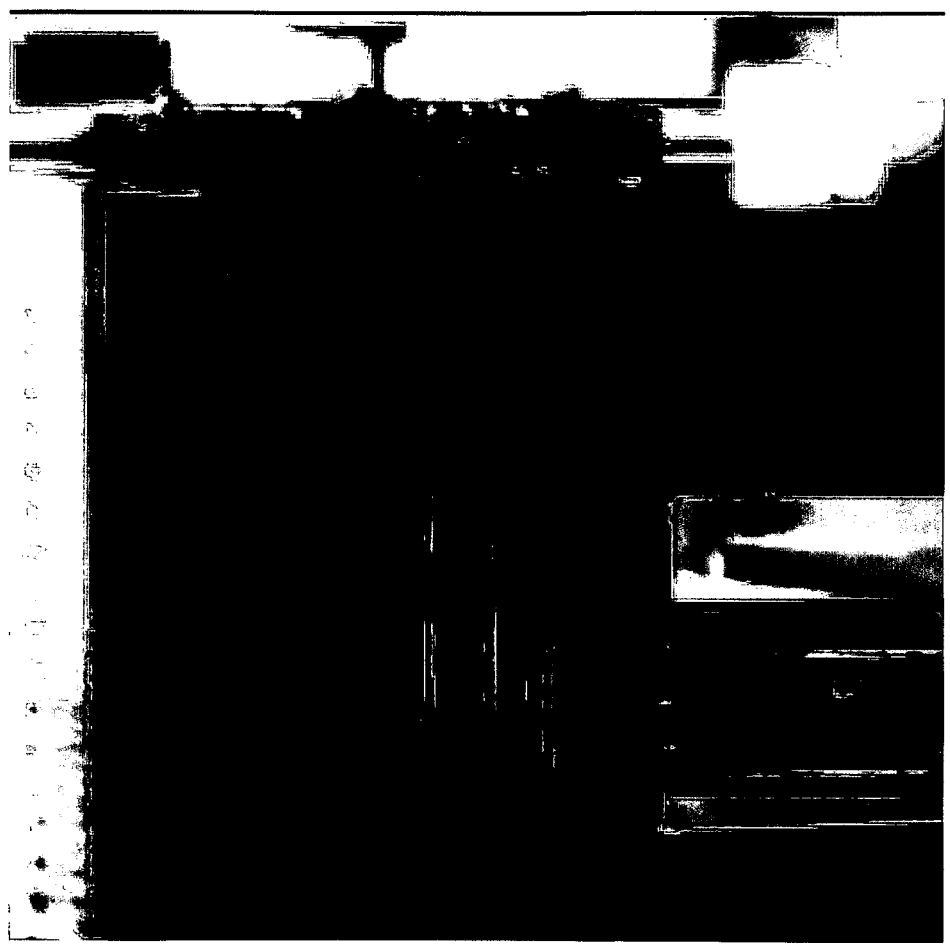
FIG. 11 is a photograph of a front view of jets according to Example 3.

FIG. 11 is a photograph of jets formed in Example 3.

Referring to FIG. 11, in operation of the apparatus in Example 3, 100% (w/w) ethylene glycol was flowed through the nozzle bank at ambient temperature with the channel insert 1000. The pressure gauge again read 11 psi, indicating the pressure of the nozzle bank. As shown, parallel flat jets 1100 were produced. The stable region of the flat jets was nominally 15 cm. Below the stable region, the jets would fray and interact with each other. The stability of the jets in this case would allow interlacing of the jets.

Example 4

In Example 4, an array of flat jets was made with the system as described in Example 2. The nozzle bank was different and is described with reference to FIG. 12A-12C. The nozzle bank is generally depicted as reference number 1200. The nozzle bank 1200 was formed with a 0.25 inch diameter stainless steel tube. The tube had a length of 10 cm and was cut in half lengthwise. Nozzles 1202 were cut into the tube 1204 using wire EDM as described. The spacing 1203 of the nozzles was about 0.6 cm along the tube as shown in FIG. 12C. Sixteen nozzles were formed in the tube. The tube was welded to stainless steel plates 1206, which in turn were welded to a machined stainless steel feed body 1208 to form a chamber. The distance from the centerline of the feed tubes to the nozzle tube was about 4 cm. The width of the chamber at the top of the feed tube was 1.016 cm, and tapered to the width of the 0.25 inch nozzle tube. Stainless steel dividers 1210 were welded inside the nozzle bank 1200. Each nozzle 1402 had a separate feed channel 1212 as depicted in the cross sectional drawing of the nozzle bank in FIG. 8B. The height of each channel in this nozzle bank was about 1.21 inches, and the dividers 1210 were spaced at about 0.201 inches apart.

Figure 12D:
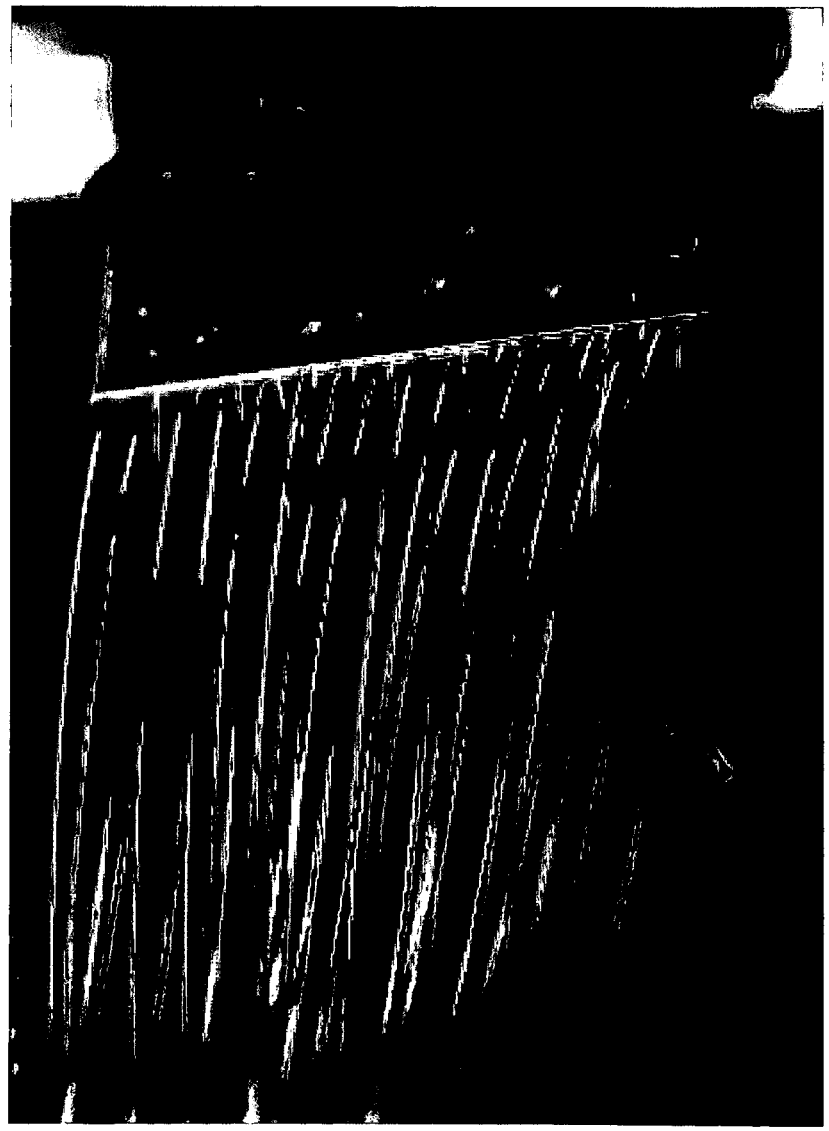
FIG. 12D is a photograph of a front view of jets according to Example 4.

FIG. 12D is a photograph of jets formed in Example 4.

Referring to FIG. 12D, in operation of the apparatus in Example 4, 100% (w/w) ethylene glycol was flowed through the nozzle bank at ambient temperature. The pressure gauge again read 11 psi, indicating the pressure of the nozzle bank. As shown, substantially parallel flat jets were produced. The stable region of the flat jets was nominally 15 cm. Below the stable region, the jets would fray and interact with each other. The stability of the jets in this case allows interlacing of the jets.

In addition, another run was performed in this Example. In this run a nozzle bank without dividers 1210 was used. That is, in this setup the nozzle bank was identical to this Example, but did not include dividers 1210. It was observed that the minimum height of the nozzle bank to produce parallel jets was 5 cm; at heights less than 5 cm the flat jets would converge as seen in Example 2.

Nozzle bank heights from 5 to 8 cm were also tested, that is, a distance from about 5 cm to about 8 cm from the centerline of the feed tubes to the nozzle tube, with no internal dividers 1210. It was observed that jets formed with a nozzle bank at 6 cm were slightly more parallel than the jets formed with a 5 cm nozzle bank height. In addition, there was no noticeable improvement in jets formed (in parallelism of the jets) with nozzle bank heights above 6 cm.

Example 5

In Example 5, a jet test apparatus was utilized to illustrate how water exits a nozzle bank array and interacts with nitrogen gas flowing in a counter flow configuration. The apparatus included an operating chamber, a fluid plenum, a gas inlet, a gas outlet, a liquid inlet coupled to the fluid plenum and a liquid outlet similar to the apparatus shown in FIG. 1.

Figure 13A:
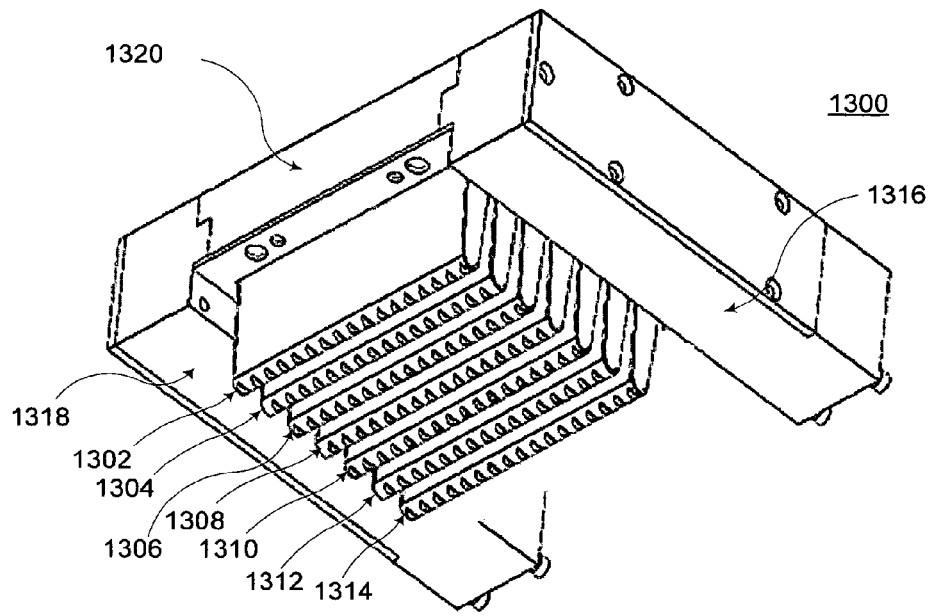
FIG. 13A illustrates a perspective view of an apparatus according to Example 5.
Figure 13B:
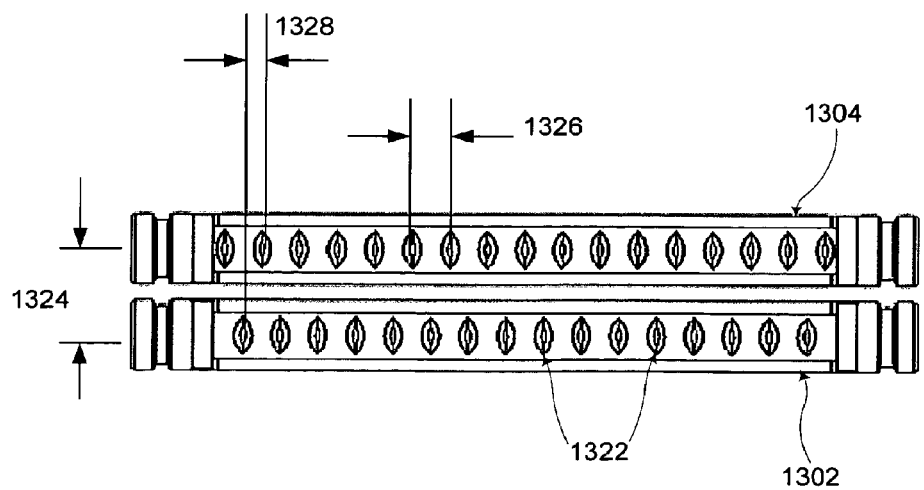
FIG. 13B illustrates a bottom view of the nozzle banks in FIG. 13A.

However, in this Example, seven nozzle banks (1302, 1304, 1306, 1308, 1310, 1312, 1314) were assembled in an array as shown in FIG. 13A to allow gas to pass between the individual nozzle banks. The individual nozzle banks were those described in Example 4. Referring to FIG. 13A, a liquid plenum included a first feed plenum 1316 and a second feed plenum 1318 coupled to a support member 1320 for two of the feed banks. In this Example, the nozzle banks were fabricated with a plurality of nozzles 1322 in each nozzle bank. Referring to FIG. 13B, the nozzles in bank 1302 are offset from the nozzles in bank in 1304, and alternated in the array so that adjacent nozzle banks had interleaved flat jets as shown in FIG. 13B. The space between adjacent nozzle banks (from centerline to centerline) is shown by reference number 1324 and in this Example was 12.5 mm. The space between adjacent nozzles is depicted as reference number 1326 and in this Example is 6 mm. The space between nozzles in adjacent nozzle banks is depicted as reference number 1328 and in this Example is 3 mm.

The nozzle banks are mounted in a feed plenum that consists of two side plenums (1316 and 1318) feeding the nozzle banks. The side plenums are machined from stainless steel and contain removable acrylic windows for observation and nozzle bank cleaning. The nozzle banks are o-ring sealed 1330 into the side plenums. The nozzle banks and side plenums are attached to a single stainless steel feed tube (not shown). Stainless steel flanges are attached to the plenum assembly to allow mounting to the reactor.

FIG. 13C is a photograph of jets formed in Example 5. FIG. 13D is another photograph of jets formed in Example 5.

Referring to FIGS. 13C and 13D in operation, water was flowed through the nozzle bank array to produce an array of flat, interlaced jets. A pressure gauge on the fluid plenum measured 11 psi supplied to the nozzle banks. FIG. 13C shows the jets operating under a vacuum environment with no counter flow. Gas was introduced at the bottom of the reactor enclosure, and flowed counter to the jet flow and out of the reactor between the nozzle banks. FIG. 13D shows the jets operating with nitrogen gas counter flow at 100 Torr and 13 m/s. It was observed that the jets in this array were very stable operating either into ambient atmosphere or vacuum conditions. When the above counter flow was introduced to the jets, very little difference was seen in jet behavior. The flat surface at the top of the jet remained under counter flow. The jets did not interact or coalesce, from vacuum to the above stated flow.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of processing gas phase molecules with a gas liquid contactor, comprising the steps of:
    forming a plurality of liquid jets with a plurality of individual nozzle banks each nozzle bank comprising a plurality of nozzles, wherein each of said liquid jets comprise a portion with a substantially planar sheet of liquid;
    providing a gas including one or more reactive or soluble gas phase molecules; and
    reducing a concentration of the one or more gas phase molecules by a mass transfer interaction between the gas phase molecules and the liquid jets.

2. The method of claim 1, wherein the mass transfer interaction comprises a volumetric mass transfer coefficient in a range from about 1 $sec^{-1}$ to about 1500 $sec^{-1}$.

3. The method of claim 1, wherein the mass transfer interaction comprises a volumetric mass transfer coefficient in a range from about 5 $sec^{-1}$ to about 150 $sec^{-1}$.

4. The method of claim 1, wherein the mass transfer interaction comprises a volumetric mass transfer coefficient in a range from about 10 $sec^{-1}$ to about 100 $sec^{-1}$.

5. The method of claim 1, wherein the providing a gas step comprises providing a gas with a gas flow rate to a reaction chamber volume ratio in a range from about 100 $min^{-1}$ to about 1000 $min^{-1}$.

6. The method of claim 1, wherein the forming a plurality of liquid jets step comprises forming the liquid jets at a pressure in a range from about 2 psi to about 30 psi.

7. The method of claim 1, wherein at least one of the liquid jets comprises a width greater than about 1 cm.

8. The method of claim 1, wherein at least one of the liquid jets comprises a width in a range from about 1 cm to about 15 cm.

9. The method of claim 1, wherein at least one of the liquid jets comprises a thickness in a range from about 10 μm to about 1000 μm.

10. The method of claim 1, wherein at least one of the liquid jets comprises a thickness in a range from about 10 μm to about 250 μm.

11. The method of claim 1, wherein at least one of the liquid jets comprises a thickness in a range from about 10 μm to about 100 μm.

12. The method of claim 1, wherein at least one of the liquid jets comprises a length in a range from about 5 cm to about 30 cm.

13. The method of claim 1, wherein at least one of the liquid jets comprises a length in a range from about 5 cm to about 20 cm.

14. The method of claim 1, wherein at least one of the liquid jets has a velocity less than 15 msec.

15. The method of claim 1, wherein at least one of the liquid jets has a velocity in a range from about 5 m/sec to about 15 msec.

16. The method of claim 1, wherein the gas phase molecules comprise at least one of sulfur oxides, nitrogen oxides, carbon dioxide, ammonia, acid gases, amines, halogens, and oxygen.

17. The method of claim 1, wherein the gas phase molecules comprise sulfur oxides.

18. The method of claim 1, wherein the gas phase molecules comprise carbon dioxide.

19. The method of claim 1, wherein the gas phase molecules comprise nitrogen oxides.

20. The method of claim 1, wherein the gas phase molecules comprise amines.

21. The method of claim 1, wherein the gas phase molecules comprise chlorine.

22. The method of claim 1, wherein the liquid jets comprise at least one of water, ammonia, ammonium salts, amines, alkanolamines, alkali salts, alkaline earth salts, peroxides, and hypochlorites.

23. The method of claim 1, wherein the liquid jets comprise at least one of a calcium salt solution and a magnesium salt solution.

24. The method of claim 1, wherein the liquid jets comprise seawater.

25. The method of claim 1, wherein the liquid jets comprise brine.

26. A method of processing gas phase molecules with a gas liquid contactor, comprising the steps of:
    forming a plurality of liquid jets with a plurality of individual nozzle banks, each nozzle bank comprising a plurality of nozzles,
    wherein each of said liquid jets comprising a portion having an essentially planar sheet of liquid, and
    wherein the liquid jets are formed with a slurry;
    providing a gas including one or more reactive or soluble gas phase molecules; and
    reducing a concentration of the gas phase molecules by a mass transfer interaction between the gas phase molecules and the liquid jets.

27. The method of claim 26, wherein at least one of the liquid jets comprises a thickness in a range from about 10 μm to about 1000 μm.

28. The method of claim 26, wherein at least one of the liquid jets comprises a thickness in a range from about 10 μm to about 250 μm.

29. The method of claim 26, wherein at least one of the liquid jets comprises a length in a range from about 5 cm to about 30 cm.

30. The method of claim 26, wherein at least one of the liquid jets comprises a length in a range from about 5 cm to about 20 cm.

31. The method of claim 26, wherein at least one of the liquid jets has a velocity less than 15 msec.

32. The method of claim 26, wherein at least one of the liquid jets has a velocity in a range from about 5 msec to about 10 msec.

33. The method of claim 26, wherein the slurry comprises a particle size up to about 500 microns.

34. The method of claim 26, wherein the slurry comprises a particle size up to about 300 microns.

35. The method of claim 26, wherein the slurry comprises a particle size up to about 80 microns.

36. The method of claim 26, wherein the slurry comprises a solid concentration in a range from about 0.2% (w/w) to about 30% (w/w).

37. The method of claim 36, wherein the solid concentration is in a range from about 10% (w/w) to about 25% (w/w).

38. The method of claim 26, wherein the gas phase molecules comprise at least one of sulfur oxides, nitrogen oxides, carbon dioxide, ammonia, acid gases, amines, halogens, and oxygen.

39. The method of claim 26, wherein the gas phase molecules comprise sulfur oxides.

40. The method of claim 26, wherein the gas phase molecules comprise carbon dioxide.

41. The method of claim 26, wherein the gas phase molecules comprise nitrogen oxides.

42. The method of claim 26, wherein the gas phase molecules comprise amines.

43. The method of claim 26, wherein the gas phase molecules comprise chlorine.

44. The method of claim 26, wherein the liquid jets comprise at least one of water, ammonia, ammonium salts, amines, alkanolamines, alkali salts, alkaline earth salts, peroxides, and hypochlorites.

45. The method of claim 26, wherein the liquid jets comprise at least one of a calcium salt solution and a magnesium salt solution.

46. The method of claim 26, wherein the liquid jets comprise seawater.

47. The method of claim 26, wherein the liquid jets comprise brine.

* * * * *